(12) United States Patent
Raksha et al.

(10) Patent No.: US 12,493,140 B2
(45) Date of Patent: Dec. 9, 2025

(54) MICRO-SIZED METAMATERIAL ABSORBERS

(71) Applicant: VIAVI Solutions Inc., San Jose, CA (US)

(72) Inventors: Vladimir P. Raksha, Santa Rosa, CA (US); Paul T. Kohlmann, Windsor, CA (US)

(73) Assignee: VIAVI Solutions Inc., San Jose, CA (US)

( * ) Notice: Subject to any disclaimer, the term of this patent is extended or adjusted under 35 U.S.C. 154(b) by 554 days.

(21) Appl. No.: 17/652,202

(22) Filed: Feb. 23, 2022

(65) Prior Publication Data

US 2022/0283341 A1 Sep. 8, 2022

Related U.S. Application Data

(60) Provisional application No. 63/157,493, filed on Mar. 5, 2021.

(51) Int. Cl.
*G02B 5/00* (2006.01)
*G02B 1/00* (2006.01)

(52) U.S. Cl.
CPC ............. *G02B 5/003* (2013.01); *G02B 1/002* (2013.01)

(58) Field of Classification Search
CPC ................................ G02B 5/003; G02B 1/002
USPC .......................................................... 359/614
See application file for complete search history.

(56) References Cited

U.S. PATENT DOCUMENTS

| 10,776,679 B2 * | 9/2020 | Bouchon | B42D 25/324 |
| 2012/0229368 A1 * | 9/2012 | Watanabe | G02B 5/3016 |
| | | | 977/932 |
| 2012/0326800 A1 | 12/2012 | Liu et al. | |
| 2013/0141190 A1 * | 6/2013 | Kitaoka | G02B 1/007 |
| | | | 156/60 |
| 2015/0255877 A1 | 9/2015 | Liu et al. | |
| 2020/0082234 A1 * | 3/2020 | Bouchon | G02B 5/008 |
| 2021/0055454 A1 * | 2/2021 | Morgan | G02B 1/002 |
| 2022/0178756 A1 * | 6/2022 | Khan | G01J 5/48 |

(Continued)

FOREIGN PATENT DOCUMENTS

| CN | 204834889 U | 12/2015 | |
| WO | WO-2013054115 A1 * | 4/2013 | G02B 1/005 |

OTHER PUBLICATIONS

Mahmud et al. "A Wide Incident Angle, Ultrathin, Polarization-Insensitive Metamaterial Absorber for Optical Wavelength Applications", IEEEAcecess, vol. 8, pp. 129525-129541.*

(Continued)

*Primary Examiner* — Stephone B Allen
*Assistant Examiner* — Boutsikaris Leonidas
(74) *Attorney, Agent, or Firm* — Harrity & Harrity, LLP

(57) ABSTRACT

In some implementations, a metamaterial absorber (MMA) is configured to absorb a particular range of electromagnetic radiation. The MMA includes a first metal or semiconductor material; a dielectric material disposed on the first metal or semiconductor material; and a second metal material disposed on the dielectric material. A length dimension associated with the MMA is less than or equal to 200 micrometers ($\mu m$), a width dimension associated with the MMA is less than or equal to 200 $\mu m$, and a thickness dimension associated with the MMA is less than or equal to 8 $\mu m$.

20 Claims, 26 Drawing Sheets

(56) References Cited

U.S. PATENT DOCUMENTS

2023/0118447 A1* 4/2023 Tiwary .................. C08L 83/06
428/447
2023/0221248 A1* 7/2023 Sarusi ................ G01N 21/8483
250/341.8

OTHER PUBLICATIONS

Cheng et al., "Design and Simulation of Multi-color Infrared CMOS Metamaterial Absorbers," Proceedings of SPIE; [Proceedings of SPIE ISSN 0277-786X vol. 10524], SPIE, May 20, 2016, vol. 9819, pp. 98191P-1-98191P-8, XP060068027, DOI: 10.1117/12.2222975.
Extended European Search Report for Application No. EP22160245.1, mailed on Aug. 3, 2022, 9 pages.
Mahmud et al., "A Wide Incident Angle, Ultrathin, Polarization-Insensitive Metamaterial Absorber for Optical Wavelength Applications," IEEE Access, Jul. 10, 2020, vol. 8, pp. 129525-129541, XP011800199, DOI: 10.1109/ACCESS.2020.3008429 [retrieved on Jul. 21, 2020].

\* cited by examiner

MICRO-SIZED METAMATERIAL ABSORBERS

RELATED APPLICATION

This application claims priority to U.S. Provisional Patent Application No. 63/157,493, for "ELECTROMAGNETIC ENERGY ABSORBING METAMATERIALS AND COATINGS," filed on Mar. 5, 2021, the content of which is incorporated by reference herein in its entirety.

BACKGROUND

An electromagnetic shield reflects or absorbs an electromagnetic wave. For example, an absorptive electromagnetic shield can absorb an electromagnetic wave that impinges a surface of the electromagnetic shield, thereby dissipating and converting the electromagnetic wave to another kind of energy, such as thermal energy.

SUMMARY

In some implementations, a metamaterial absorber (MMA) is configured to absorb a particular range of electromagnetic radiation. The MMA includes a first metal or semiconductor material; a dielectric material disposed on the first metal or semiconductor material; and a second metal material disposed on the dielectric material, wherein: a length dimension associated with the MMA is less than or equal to 200 micrometers ($\mu m$), a width dimension associated with the MMA is less than or equal to 200 $\mu m$, and a thickness dimension associated with the MMA is less than or equal to 8 $\mu m$.

In some implementations, a coating disposed on a surface of a component includes a first layer that includes a first plurality of MMAs disposed within a first binder, wherein each MMA, of the first plurality of MMAs, comprises: a first metal or semiconductor material; a dielectric material disposed on the first metal or semiconductor material; and a second metal material disposed on the dielectric material, wherein: a length dimension associated with the MMA is less than or equal to 200 $\mu m$, a width dimension associated with the MMA is less than or equal to 200 $\mu m$, and a thickness dimension associated with the MMA is less than or equal to 8 $\mu m$.

In some implementations, a method includes depositing, by a deposition system, a release material on a resin material, wherein the resin material is embossed with a plurality of unit cells; depositing, by the deposition system, a first metal or semiconductor material on the release material; depositing, by the deposition system, a dielectric material on the first metal or semiconductor material; and depositing, by the deposition system, a second metal material on the dielectric material, wherein: portions of the first metal or semiconductor material, the dielectric material, and the second metal material that are respectively deposited on the plurality of unit cells form a plurality of MMAs, a length dimension associated with each MMA, of the plurality of MMAs, is less than or equal to 200 $\mu m$, a width dimension associated with each MMA, of the plurality of MMAs, is less than or equal to 200 $\mu m$, and a thickness dimension associated with each MMA, of the plurality of MMAs, is less than or equal to 8 $\mu m$.

DETAILED DESCRIPTION

Figure 1A:
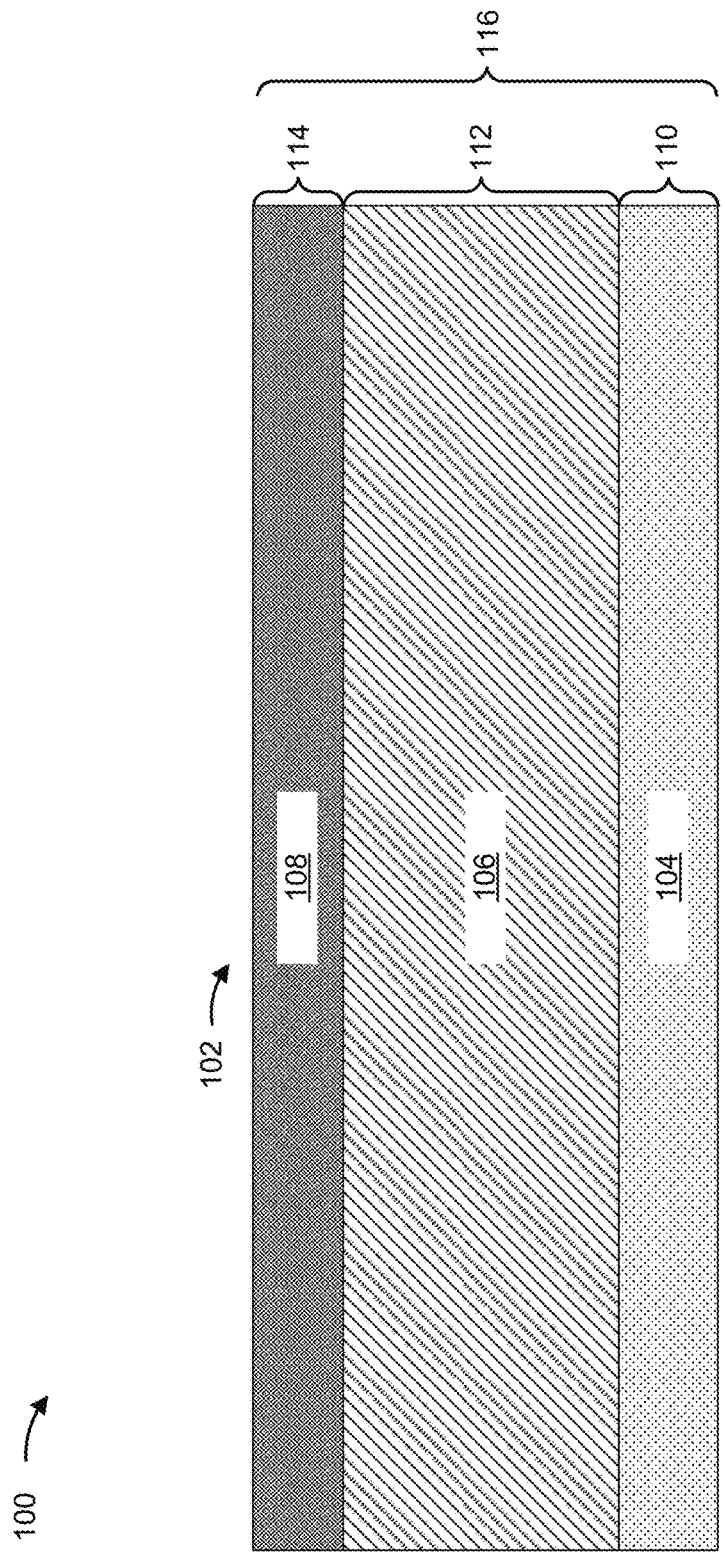
FIGS. 1A-1B are diagrams of an example implementation described herein.

The following detailed description of example implementations refers to the accompanying drawings. The same reference numbers in different drawings may identify the same or similar elements.

In some cases, an absorptive electromagnetic shield can include a multitude of magnetic absorbers that are suspended in a matrix of an organic binder (e.g., silicone, neoprene, urethane, or nitrile). The magnetic absorbers are metallic flakes that comprise a ferromagnetic material, such as a cobalt-iron-silicon alloy, an iron-zirconium alloy, or a cobalt-iron-boron alloy. However, the metallic flakes do not conform to a particular shape, which reduces an effectiveness of the metallic flakes as magnetic absorbers for some ranges of electromagnetic waves. Further, the metallic flakes typically have a large size. For example, a typical metallic flake has a length dimension and/or a width dimension that is greater than or equal to 1 millimeter (mm) and a thickness dimension that is greater than or equal to 10 micrometers ($\mu m$), which causes the metallic flakes to be heavy. Consequently, this reduces a likelihood that the metallic flakes can be included in a coating, such as to provide an electromagnetic shield for a component, in a practical application because inclusion of the metallic flakes in the coating can substantially increase a weight of the component.

Some implementations described herein provide an MMA that is configured to absorb a particular range of electromagnetic radiation. The MMA includes a first metal or semiconductor material, a dielectric material disposed on the first metal or semiconductor material, and a second metal material disposed on the dielectric material. A length dimension associated with the MMA is less than or equal to 200 micrometers ($\mu m$), a width dimension associated with the MMA is less than or equal to 200 $\mu m$, and a thickness dimension associated with the MMA is less than or equal to 8 $\mu m$. Accordingly, some implementations described herein provide a micro-sized MMA.

In some implementations, a coating that is disposed on a surface of a component (e.g., a metal component) includes a layer that includes a plurality of MMAs (e.g., where each MMA is micro-sized as described above). The plurality of MMAs can include MMAs of different sizes and profiles, which enables the coating to absorb one or more particular ranges of electromagnetic radiation. Further, because the plurality of MMAs are micro-sized, the coating is easier to apply to the component (e.g., as compared to a coating that includes metallic flakes), and the coating provides a similar or improved electromagnetic radiation absorption performance while being lighter than a similar coating that includes metallic flakes. Further, the plurality of MMAs can be configured to have different orientations within the coating, and/or the coating can include one or more additional layers that include an additional plurality of MMAs, which further improves an electromagnetic radiation absorption performance of the coating (e.g., as compared to a typical coating that includes metallic flakes).

In some implementations, a formation process for forming the plurality of MMAs is provided. The process includes depositing a release material on a resin material (e.g., wherein the resin material is embossed with a plurality of unit cells), depositing a first metal or semiconductor material on the release material, depositing a dielectric material on the first metal or semiconductor material, and depositing a second metal material on the dielectric material. Accordingly, portions of the first metal or semiconductor material, the dielectric material, and the second metal material that are respectively deposited on the plurality of unit cells form the plurality of MMAs. The formation process further includes removing the plurality of MMAs from the release material and singulating the plurality of MMAs. In this way, a multitude of micro-sized MMAs (e.g., thousands, millions, or billions, of MMAs) may be formed during a same formation process, which is not currently possible using existing magnetic absorber formation techniques.

Figure 1B:
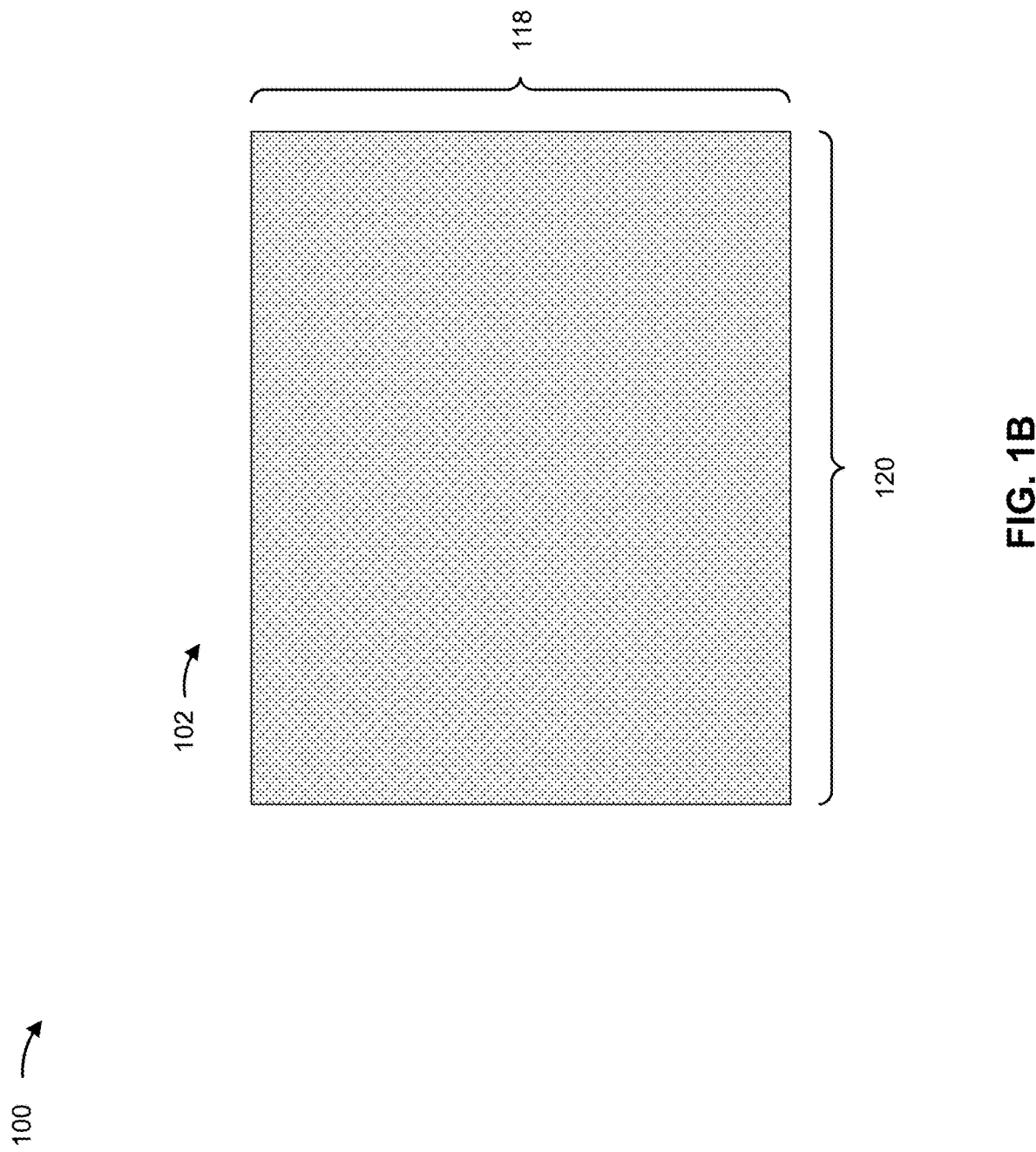

FIGS. 1A-1B are diagrams of an example implementation 100 described herein. As shown in FIG. 1A, example implementation 100 may include a metamaterial absorber (MMA) 102. FIG. 1A shows a cross-sectional view of the MMA 102. In some implementations, the MMA 102 may be configured to absorb at least one particular range of electromagnetic radiation. For example, the MMA 102 may be configured to absorb one or more ranges of electromagnetic radiation between 300 micrometers (μm) (e.g., greater than or equal to 300 μm) and 10 centimeters (cm) (e.g., less than or equal to 10 cm). The one or more ranges of electromagnetic radiation may include a first range of electromagnetic radiation between 300 μm (e.g., greater than or equal to 300 μm) and 1 mm (e.g., less than or equal to 1 mm), a second range of electromagnetic radiation between 11 mm (e.g., greater than or equal to 11 mm) and 1 cm (e.g., less than or equal to 1 cm), and/or a third range of electromagnetic radiation between 2 cm (e.g., greater than or equal to 2 cm) and 10 cm (e.g., less than or equal to 10 cm), among other examples.

As shown in FIG. 1A, the MMA 102 may include a first metal or semiconductor material 104 (e.g., that includes at least 1% of a metal), a dielectric material 106 (e.g., that includes at least 1% of a dielectric) disposed on the first metal or semiconductor material 104, and a second metal material 108 (e.g., that includes at least 1% of a metal) disposed on the dielectric material 106. The first metal or semiconductor material 104 may be a resistive material and/or a conductive material and may include, for example, an aluminum material (e.g., that includes aluminum, an aluminum film, or another aluminum-based material), a copper material (e.g., that includes copper, a copper film, or another copper-based material), and/or a silicon material (e.g., that includes silicon, a silicon film, or another silicon-based material). A thickness 110 of the first metal or semiconductor material 104 may be less than or equal to 1 μm, such as between 5 nanometers (nm) and 1 μm (e.g., greater than or equal to 5 nm and less than or equal to 1 μm).

The dielectric material 106 may be an inorganic dielectric material (e.g., a thermally evaporated inorganic dielectric material, such as an oxide, or a fluoride, among other examples) or an organic dielectric material, and may include, for example, a magnesium fluoride material and/or a silicon dioxide material. A thickness 112 of the dielectric material 106 may be less than or equal to 5 μm, such as between 50 nm and 5 μm (e.g., greater than or equal to 50 nm and less than or equal to 5 μm). The second metal material 108 may be a magnetic metal material (e.g., a ferromagnetic material) and may include, for example, stainless steel (e.g., 300 series annealed iron-nickel-chromium stainless steel, 400 series iron-chromium stainless steel, or another stainless steel), mild steel, element nickel, elemental iron, an iron-nickel alloy (e.g., Hypernik, Permalloy, mu-metal, alloy 50, or supermalloy), an iron-aluminum alloy (e.g., Alfenol), a nickel-chromium-aluminum alloy (e.g., Kanthal), an iron-silicon alloy, an iron-ytterbium alloy (e.g., Therfenol), an iron-gallium alloy (e.g., Galfenol), a ferrite (e.g., a hard ferrite or a soft ferrite), a samarium-cobalt alloy, a neodymium-boron-iron alloy, a carbon-enriched iron, an aluminum-nickel-cobalt alloy, an iron-nickel alloy, and/or another magnetic metal material. A thickness 114 of the second metal material 108 may be less than or equal to 2 μm, such as between 10 nm and 2 μm (e.g., greater than or equal to 10 nm and less than or equal to 2 μm). In some implementations, a thickness dimension 116 (e.g., a sum of the thickness 110, the thickness 112, and the thickness 114) of the MMA 102 may be less than or equal to 8 μm, such as between 65 nm and 8 μm (e.g., greater than or equal to 65 nm and less than or equal to 8 μm).

FIG. 1B shows a top-down view of the MMA 102. In some implementations, the MMA 102 may have a polygonal profile (e.g., a C-shaped profile, an H-shaped profile, a U-shaped profile, an I-shaped profile, a loop-shaped profile, a cross-shaped profile, a bar-shaped profile, or another polygon-shaped profile) or a round profile. For example, as shown in FIG. 1B, the MMA 102 may have a square profile. Additionally, in some implementations, a length dimension 118 of the MMA 102 and a width dimension 120 of the MMA 102 may each be less than or equal to 200 μm, such as between 3 μm and 200 μm (e.g., greater than or equal to 3 μm and less than or equal to 200 μm). That is, a profile of the MMA 102 (e.g., as seen from a top-down view of the MMA 102) may have a critical dimension that is less than or equal to 200 μm.

As indicated above, FIGS. 1A-1B are provided as one or more examples. Other examples may differ from what is described with regard to FIGS. 1A-1B.

Figure 2A:
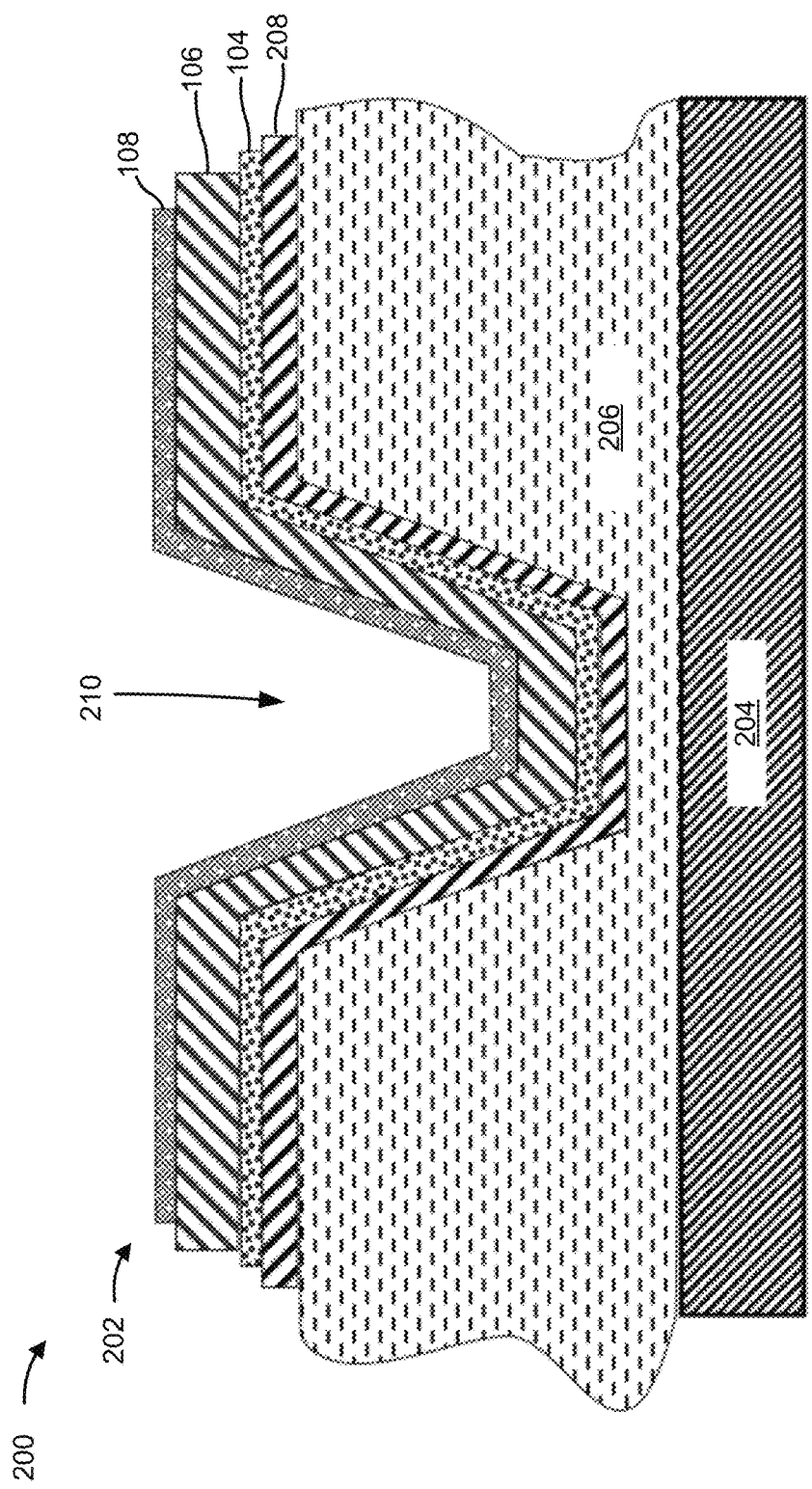
FIGS. 2A-2C are diagrams of an example implementation described herein.
Figure 2B:
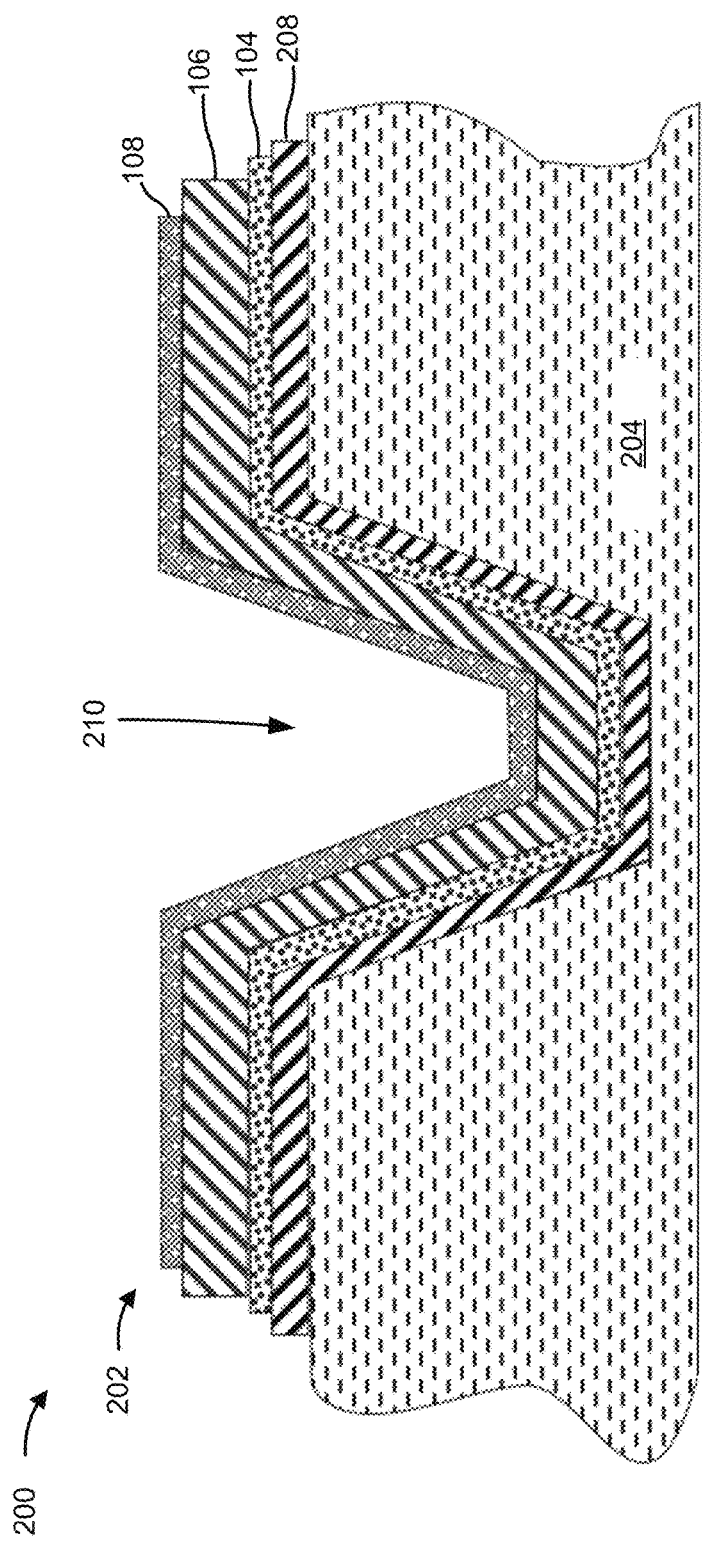
Figure 2C:
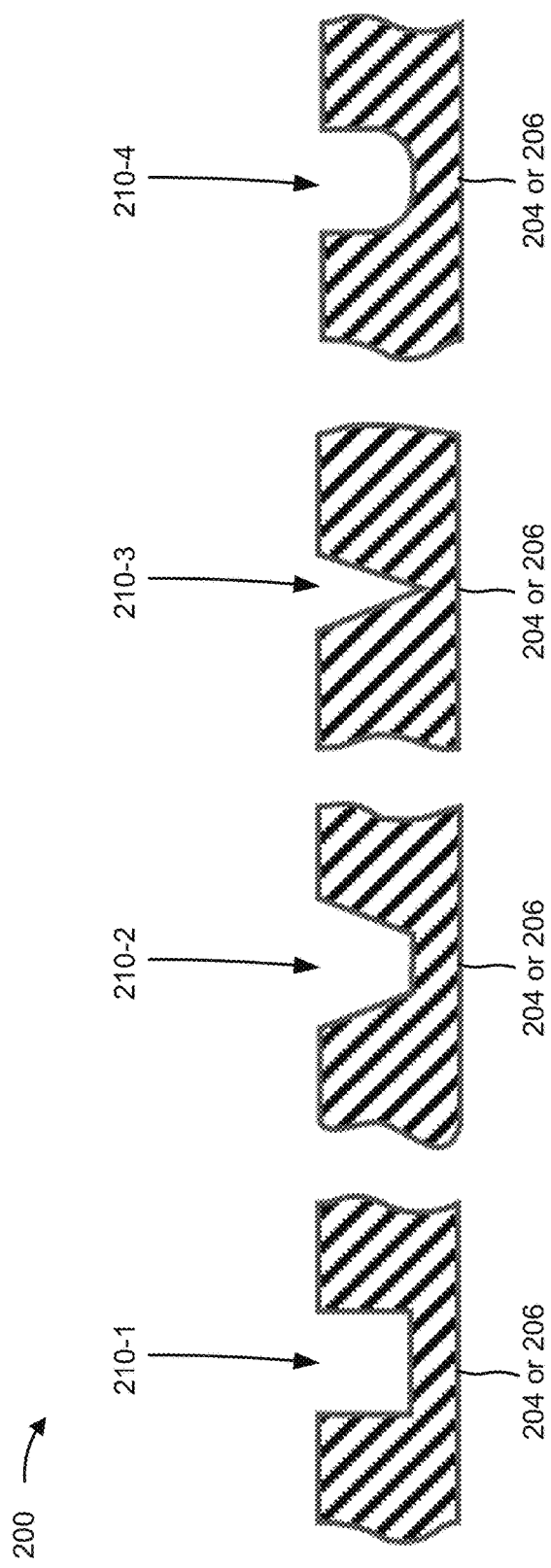

FIGS. 2A-2C are diagrams of an example implementation 200 described herein. FIG. 2A shows a cross-sectional view of a first example configuration of a structure 202 that is formed to create a plurality of MMAs 102. As shown in FIG. 2A, the structure 202 may include a substrate 204 (e.g., a polymeric substrate, such as a polyester substrate), a resin 206 disposed on the substrate 204, a release material 208 (e.g., that comprises a water-soluble material, such as sodium chlorite, cryolite, or sodium borate) disposed on the resin 206, the first metal or semiconductor material 104 disposed on the release material 208, the dielectric material 106 disposed on the first metal or semiconductor material 104, and/or the second metal material 108 disposed on the dielectric material 106.

FIG. 2B shows a cross-sectional view of a second example configuration of the structure 202. As shown in FIG. 2B, the structure 202 may include the substrate 204 (e.g., a microstructure polyester web substrate), the release material 208 disposed on the substrate 204, the first metal or semiconductor material 104 disposed on the release material 208, the dielectric material 106 disposed on the first metal or semiconductor material 104, and/or the second metal material 108 disposed on the dielectric material 106. That is, a difference between the first example configuration and the second example configuration of the structure 202, as shown in FIGS. 2A-2B, is that the structure 202 includes the resin 206 in the first example configuration and the structure 202 does not include the resin 206 in the second example configuration.

In some implementations, a base layer of the structure 202 (e.g., the resin 206 in the first example configuration or the substrate 204 in the second example configuration) may be embossed with a plurality of unit cells (e.g., as further described herein). Accordingly, the base layer (e.g., the resin 206, as shown in FIG. 2A, or the substrate 204, as shown in FIG. 2B) may be formed (e.g., embossed) to include one or more or grooves 210 (e.g., that separate one unit cell from another unit cell). After the one or more grooves 210 are formed in the base layer, a formation process may be used to deposit the release material 208, the first metal or semiconductor material 104, the dielectric material 106, and/or the second metal material 108 (e.g., on the base layer).

For example, a deposition system (e.g., that utilizes a vacuum deposition process, a thermal evaporation in a vacuum process, a magnetron sputtering process, and/or another process) may deposit the release material 208 on the base layer (e.g., on the plurality of unit cells of the base layer), may deposit the first metal or semiconductor material 104 on the release material 208, may deposit the dielectric material 106 on the first metal or semiconductor material 104, and may deposit the second metal material 108 on the dielectric material 106. Accordingly, the release material 208, the first metal or semiconductor material 104, the dielectric material 106, and/or the second metal material 108 may have grooves that correspond to the one or more grooves 210 of the base layer (e.g., the resin 206, as shown in FIG. 2A, or the substrate 204, as shown in FIG. 2B).

In some implementations, portions of the first metal or semiconductor material 104, the dielectric material 106, and/or the second metal material 108 that are respectively deposited on the plurality of unit cells form the plurality of MMAs 102. For example, a portion of the first metal or semiconductor material 104, the dielectric material 106, and/or the second metal material 108 that is deposited within a region associated with a unit cell and defined by the one or more grooves 210 may comprise an MMA 102 of the plurality of MMAs 102.

After formation of the structure 202, the formation process may include removing the plurality of MMAs 102 from the release material 208 and/or singulating the plurality of MMAs 102 (e.g., from each other). For example, the deposition system may immerse the structure 202 in water, which may cause the release material 208 to dissolve and thereby separate the plurality of MMAs 102 from the rest of the structure 202 (e.g., that includes the substrate 204 and/or the resin 206). The deposition system may remove the plurality of MMAs 102 from the water and may dry the plurality of MMAs 102 (e.g., at an elevated temperature, such as greater than or equal to 100 degrees Celsius). This may cause cracking and/or separation along one or more grooves between the plurality of MMAs 102 (e.g., that were aligned with the one or more grooves 210 of the base layer) and thereby cause singulation of the plurality of MMAs 102. In some implementations, the formation process may form MMAs 102 that have different sizes, profiles, and/or electromagnetic absorption properties (e.g., as described elsewhere herein).

FIG. 2C shows a cross-section of the base layer of the structure 202 (e.g., the resin 206 in the first example configuration, as shown in FIG. 2A, or the substrate 204 in the second example configuration, as shown in FIG. 2B) and different profile variations of the one or more grooves 210. For example, FIG. 2C shows one or more grooves 210 with a straight-edge profile (210-1), with a tapered-edge profile (210-2), a triangular profile (210-3), or a rounded profile (210-4). In some implementations, a width dimension of a groove 210 may be less than or equal to 4 µm, such as between 50 nm and 4 µm (e.g., greater than or equal to 50 nm and less than or equal to 4 µm). A depth dimension of a groove 210 may less than or equal to 400 µm, such as between 50 nm and 400 µm (e.g., greater than or equal to 50 nm and less than or equal to 400 µm).

As indicated above, FIGS. 2A-2C are provided as one or more examples. Other examples may differ from what is described with regard to FIGS. 2A-2C.

Figure 3A:
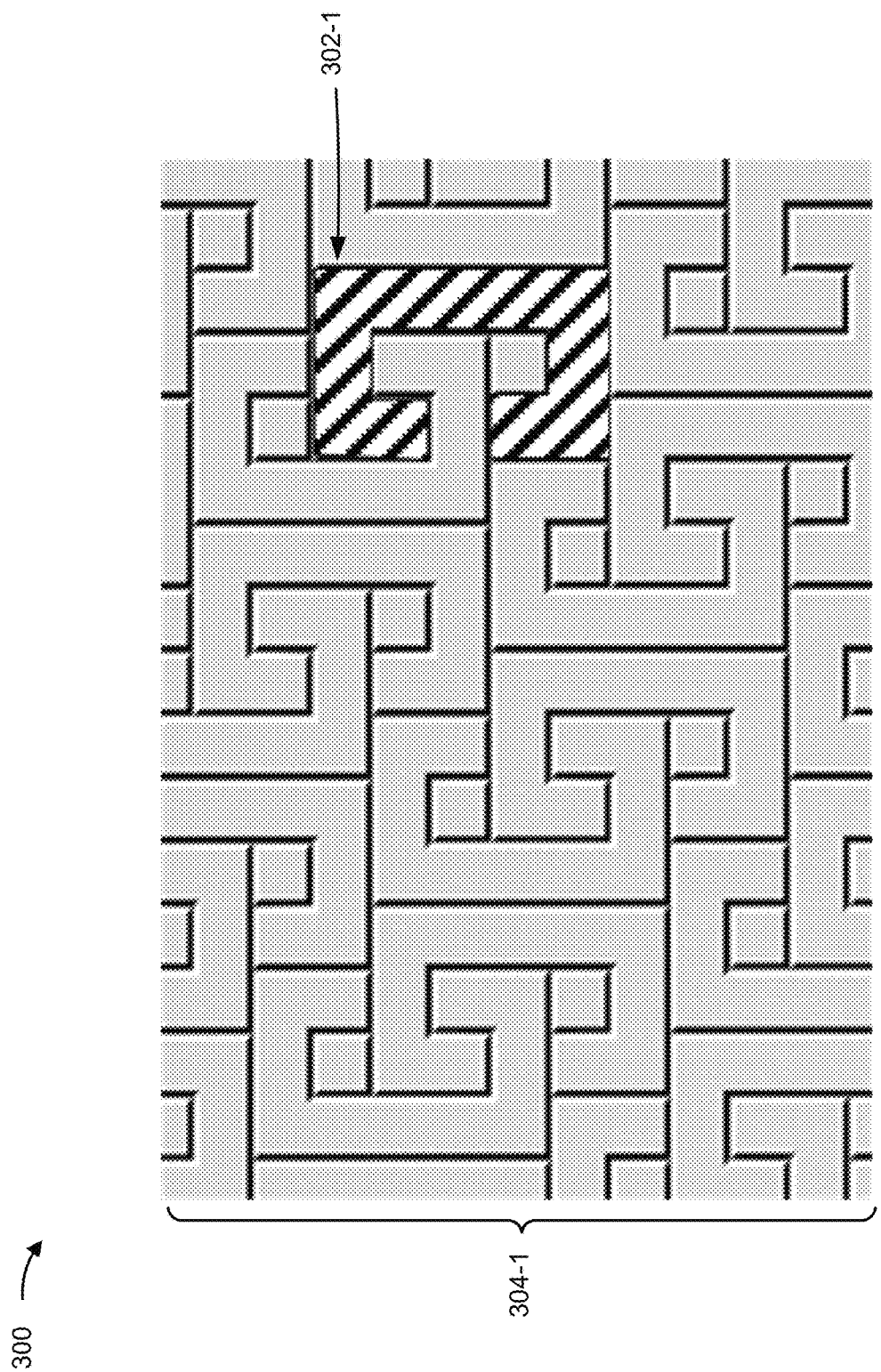
FIGS. 3A-3J are diagrams of example configurations of a base layer described herein and a plurality of unit cells formed thereon.
Figure 3B:
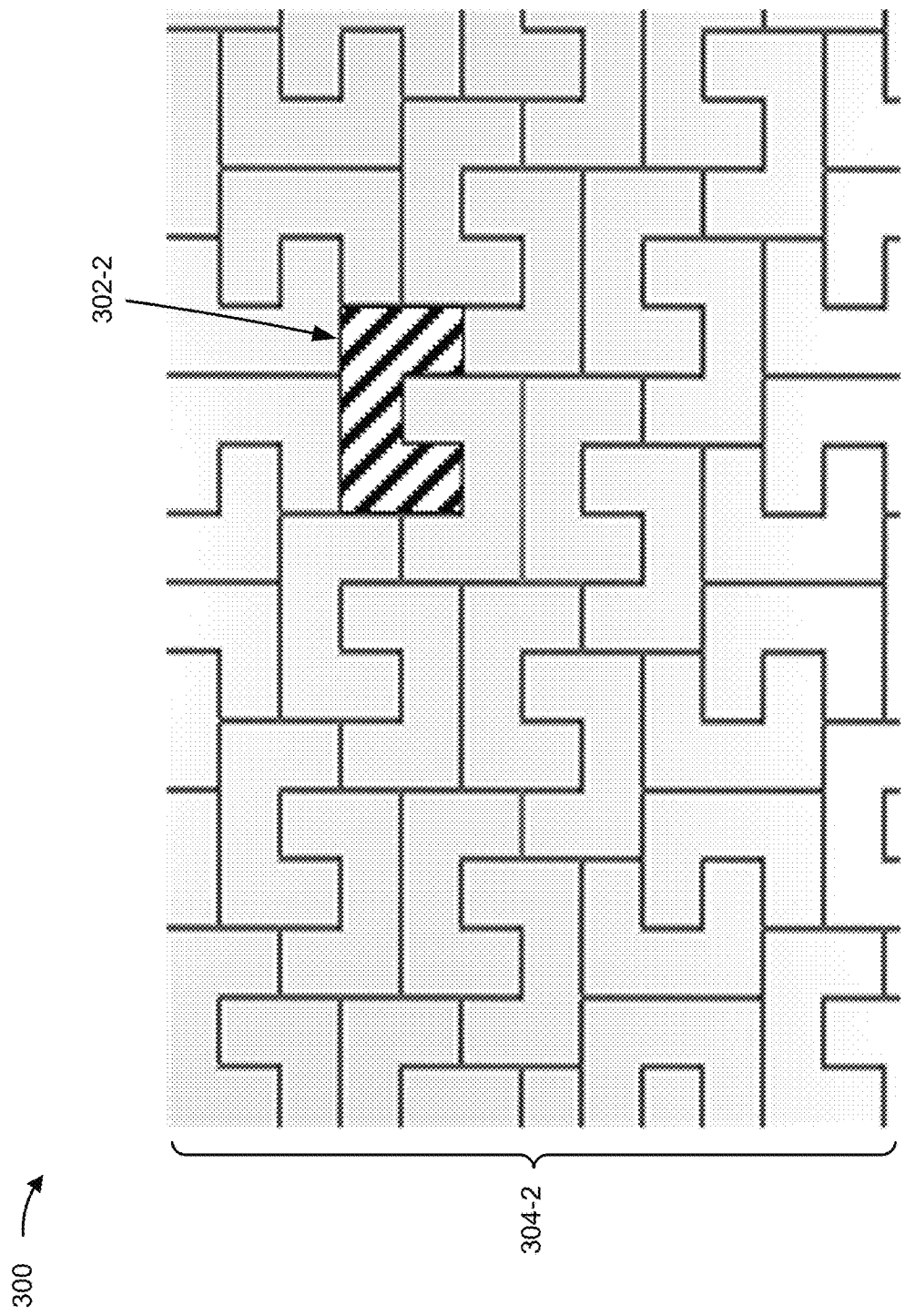
Figure 3C:
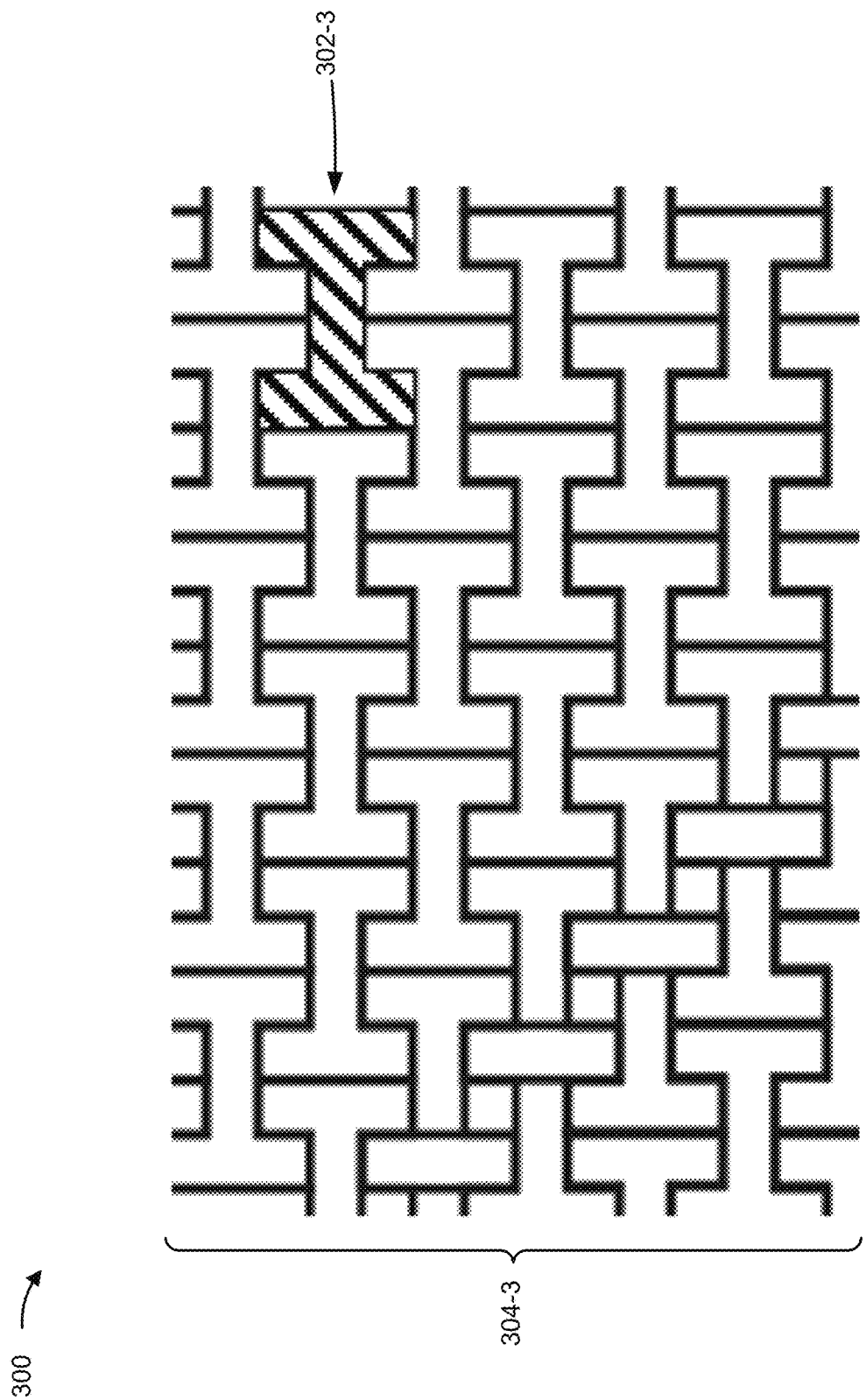
Figure 3D:
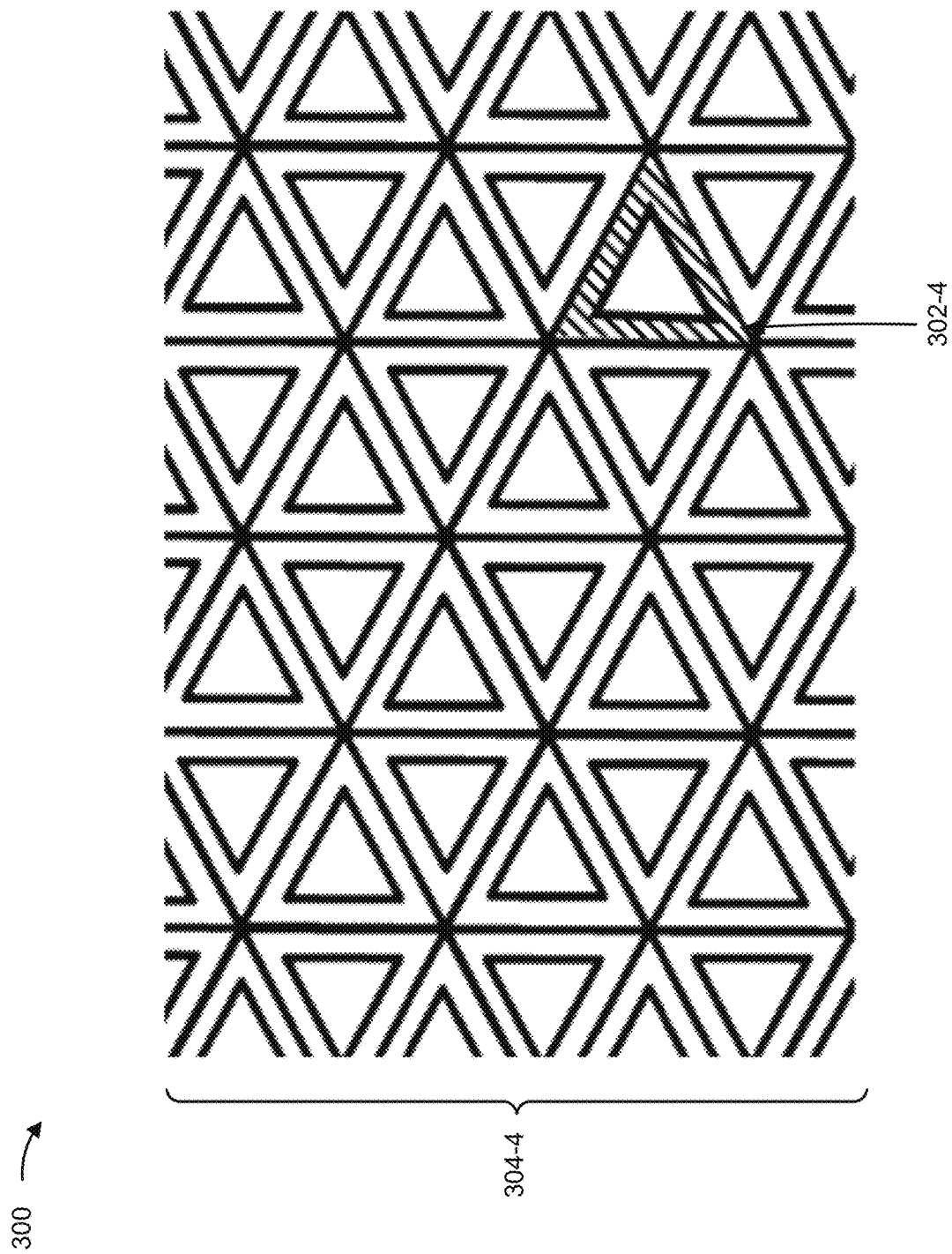
Figure 3E:
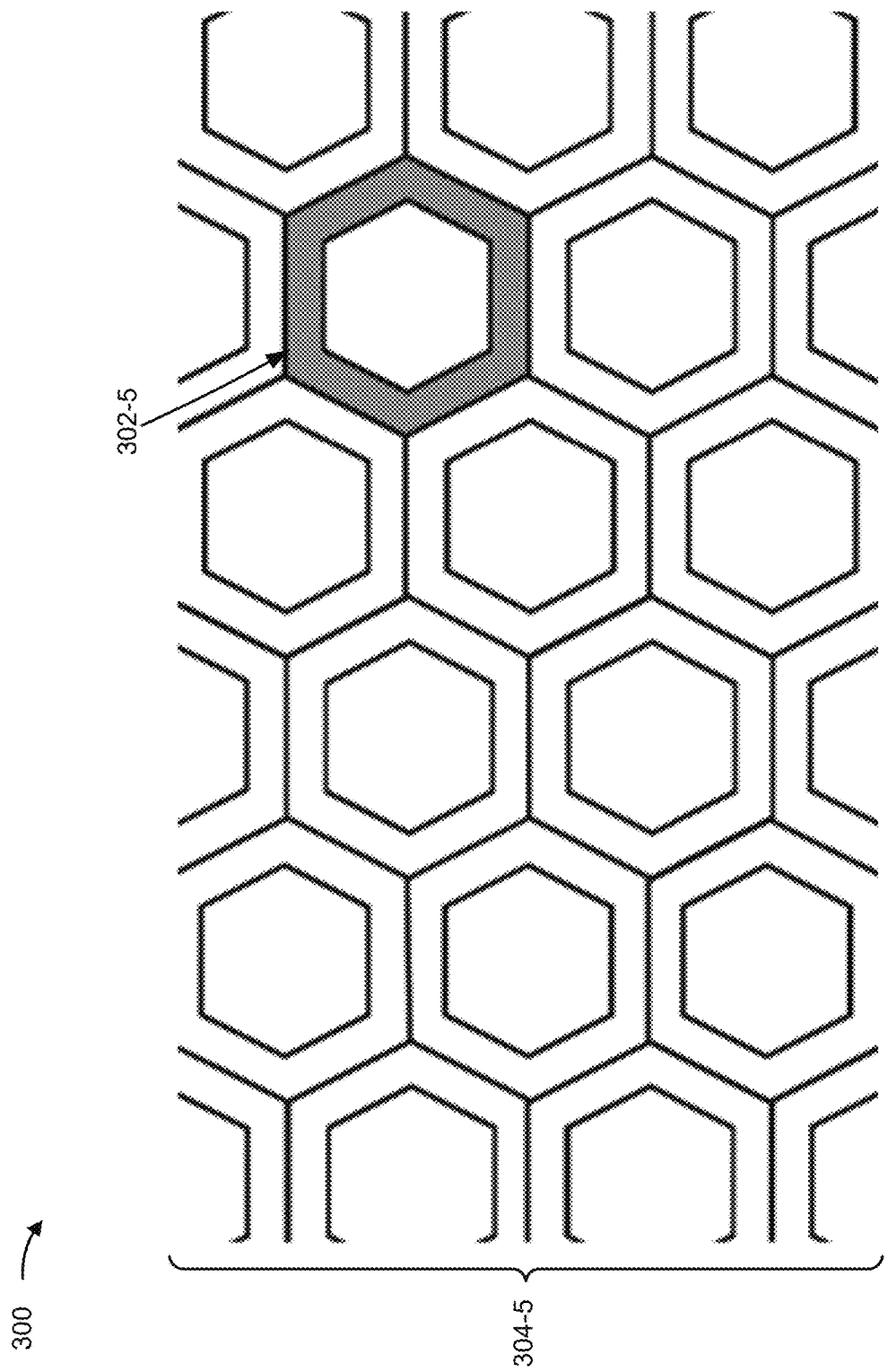
Figure 3F:
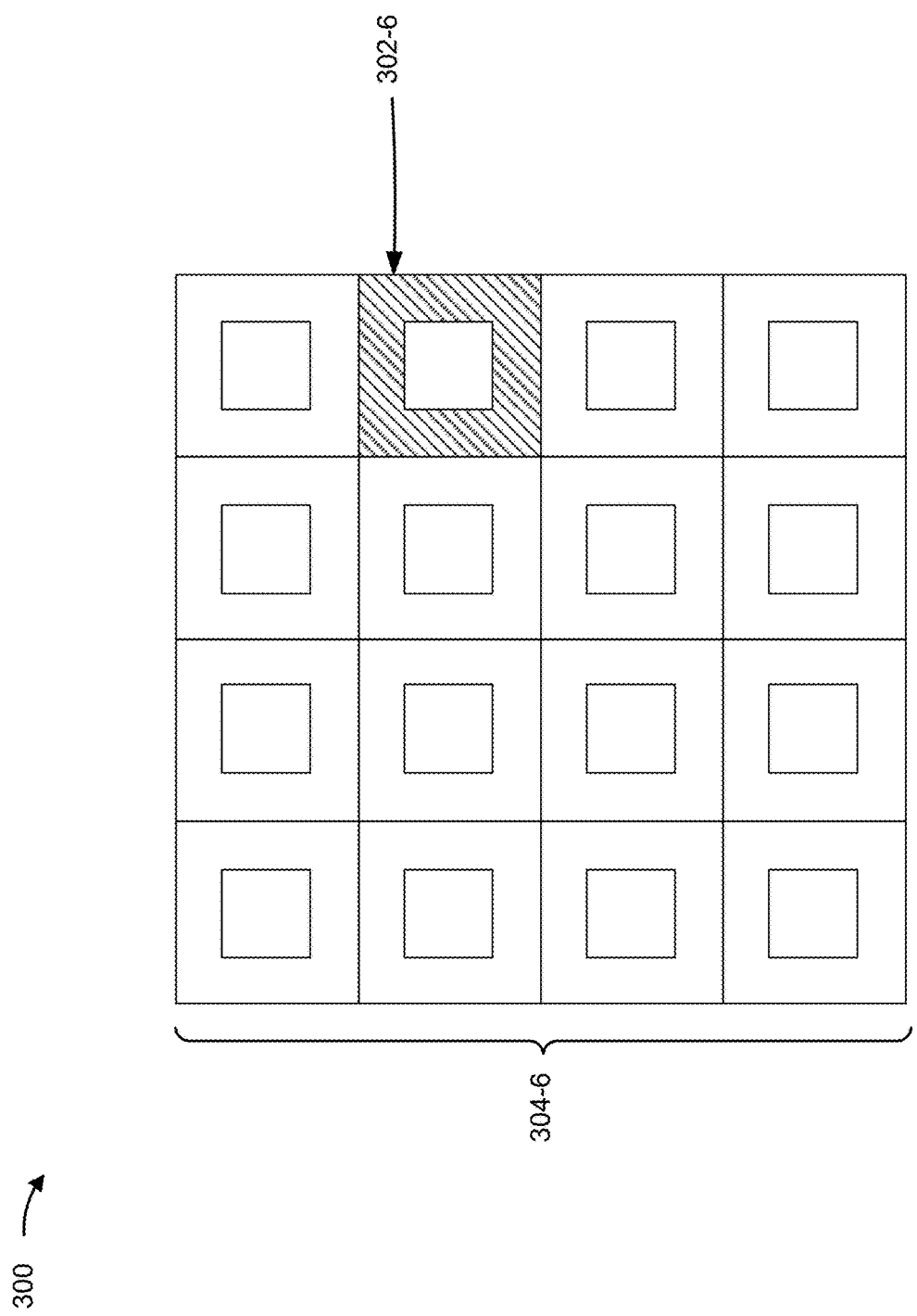
Figure 3G:
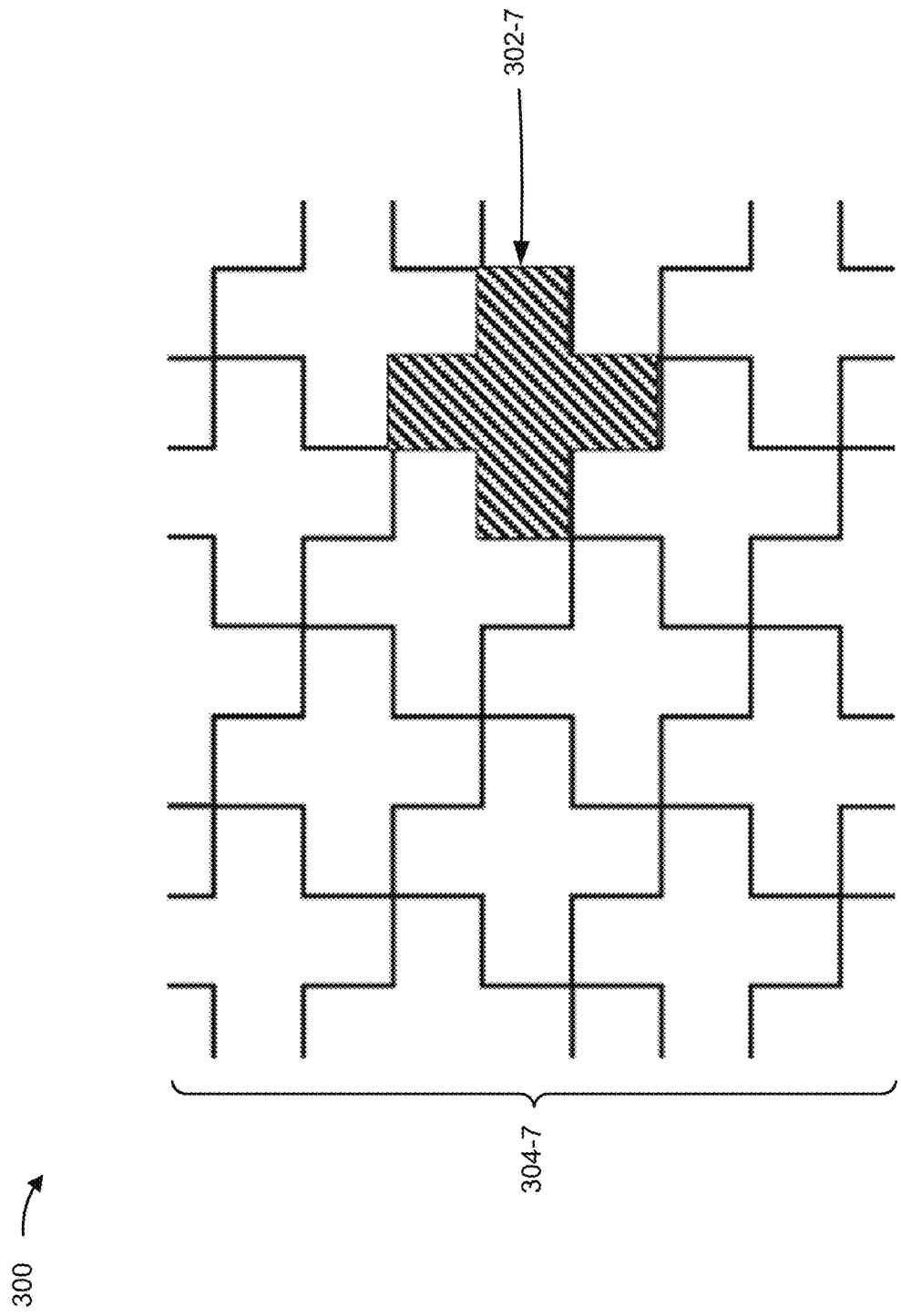

FIGS. 3A-3J are diagrams of example configurations 300 of the base layer of the structure 202 (e.g., the resin 206 in the first example configuration, as shown in FIG. 2A, or the substrate 204 in the second example configuration, as shown in FIG. 2B) described herein. In some implementations, the base layer may be embossed with a plurality of unit cells 302 that are arranged in at least one tessellation pattern 304. The plurality of unit cells 302 may each have, for example, a polygonal profile or a round profile. For example, a unit cell 302-1 may have a C-shaped profile (e.g., a C split-ring profile) that is arranged in a tessellation pattern 304-1 (e.g., as shown in FIG. 3A); a unit cell 302-2 may have a U-shaped profile (e.g., a U split-ring profile) that is arranged in a tessellation pattern 304-2 (e.g., as shown in FIG. 3B); a unit cell 302-3 may have an H-shaped profile that is arranged in a tessellation pattern 304-3 (e.g., as shown in FIG. 3C); a unit cell 302-4 may have a triangle-shaped profile (e.g., with a hollow central portion) that is arranged in a tessellation pattern 304-4 (e.g., as shown in FIG. 3D); a unit cell 302-5 may have a hexagon-shaped profile (e.g., with a hollow central portion, also termed a hexagonal ring-shaped profile) that is arranged in a tessellation pattern 304-5 (e.g., as shown in FIG. 3E); a unit cell 302-6 may have a square-shaped profile (e.g., with a hollow central portion, also termed a square ring-shaped profile) that is arranged in a tessellation pattern 304-6 (e.g., as shown in FIG. 3F); and/or a unit cell 302-7 may have a cross-shaped profile that is arranged in a tessellation pattern 304-7 (e.g., as shown in FIG. 3G).

Figure 3H:
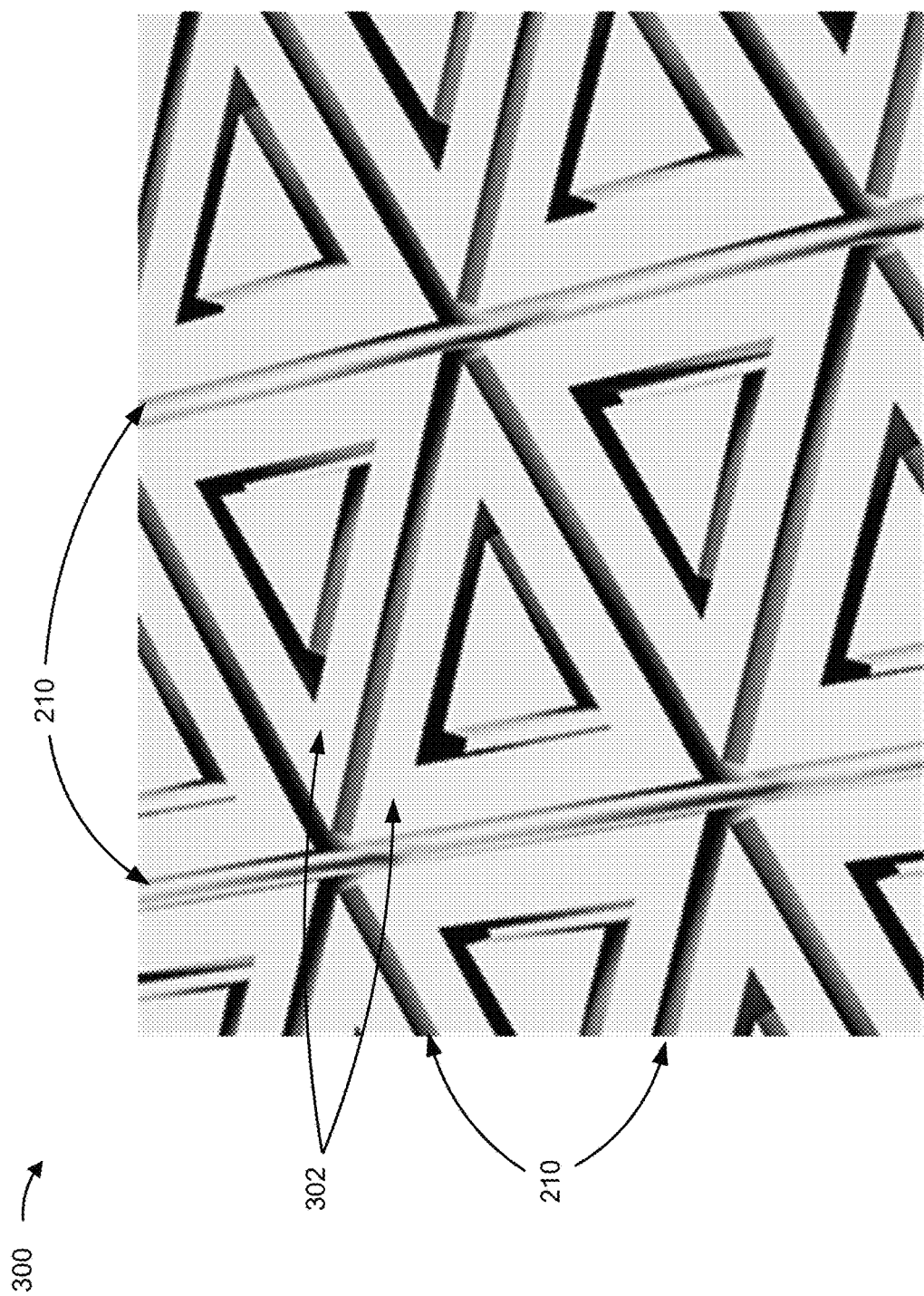
Figure 3I:
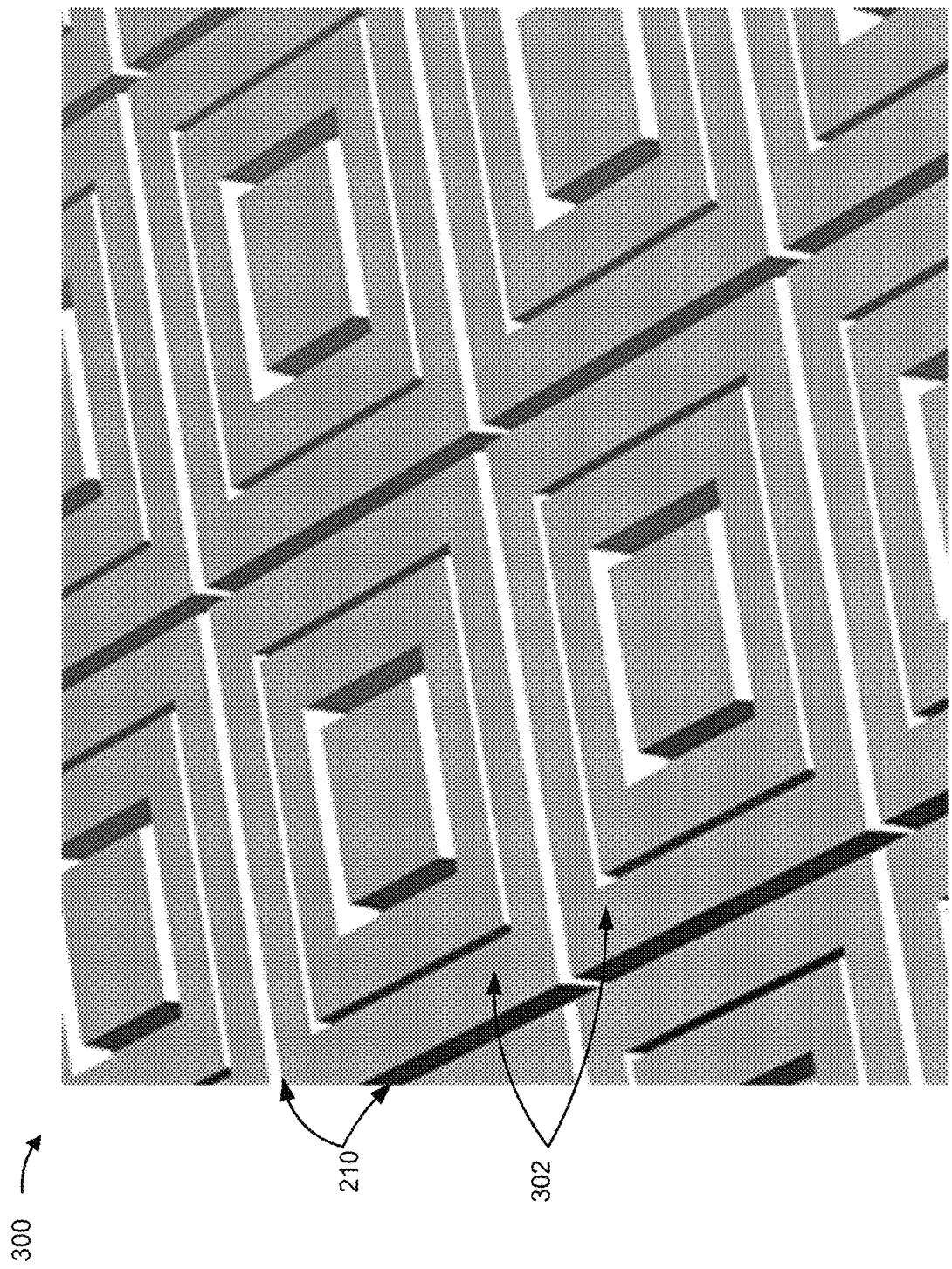
Figure 3J:
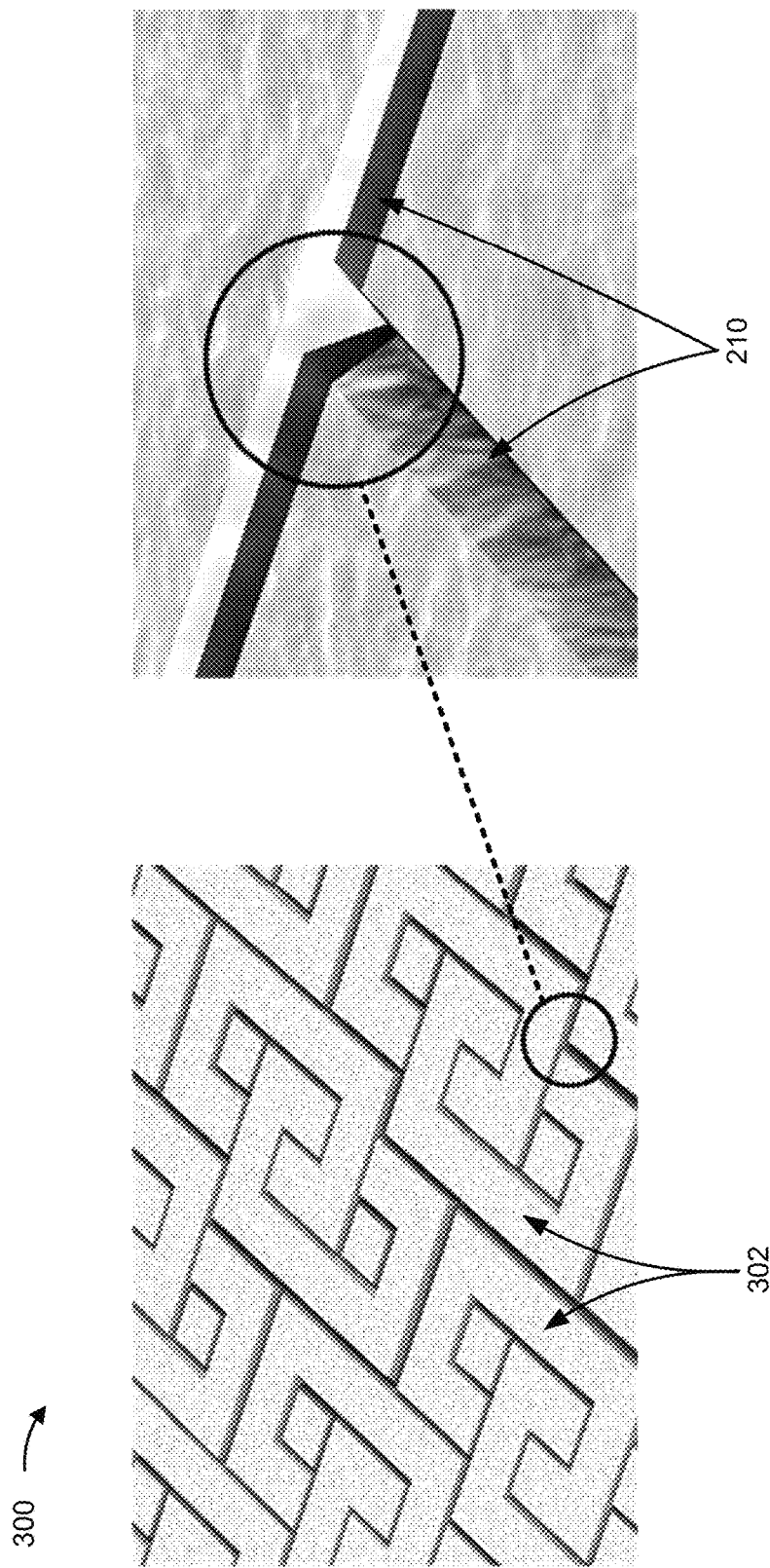

FIGS. 3H-3J show that the base layer of the structure 202 (e.g., the resin 206 in the first example configuration, as shown in FIG. 2A, or the substrate 204 in the second example configuration, as shown in FIG. 2B) may be embossed to include the one or more grooves 210, which separate one unit cell 302 from another unit cell 302. In this way, the plurality of MMAs 102 may be formed on the plurality of unit cells 302 of the base layer (e.g., as described herein in relation to FIGS. 2A-2C). Accordingly, each MMA 102, of the plurality of MMAs 102, may have a profile that is similar to a corresponding unit cell 302, of the plurality of unit cells 302, upon which the MMA 102 is formed.

As indicated above, FIGS. 3A-3J are provided as one or more examples. Other examples may differ from what is described with regard to FIGS. 3A-3J.

FIGS. 4A-4D are diagrams of an example implementation 400 described herein. As shown in FIGS. 4A-4D, example implementation 400 may include a component 402 (e.g., a metal component of a land vehicle, an airplane, a boat, or another machine), and a coating 404 disposed on the surface of the component 402. The coating 404 may include the plurality of MMAs 102, which may be disposed within a binder 406 (e.g., an organic binder) of the coating 404 (e.g., in a single layer of the coating 404). A volume concentration of the plurality of MMAs 102 within the binder 406 may be, for example, between 1% and 40% (e.g., greater than or equal to 1% and less than or equal to 40%).

Figure 4A:
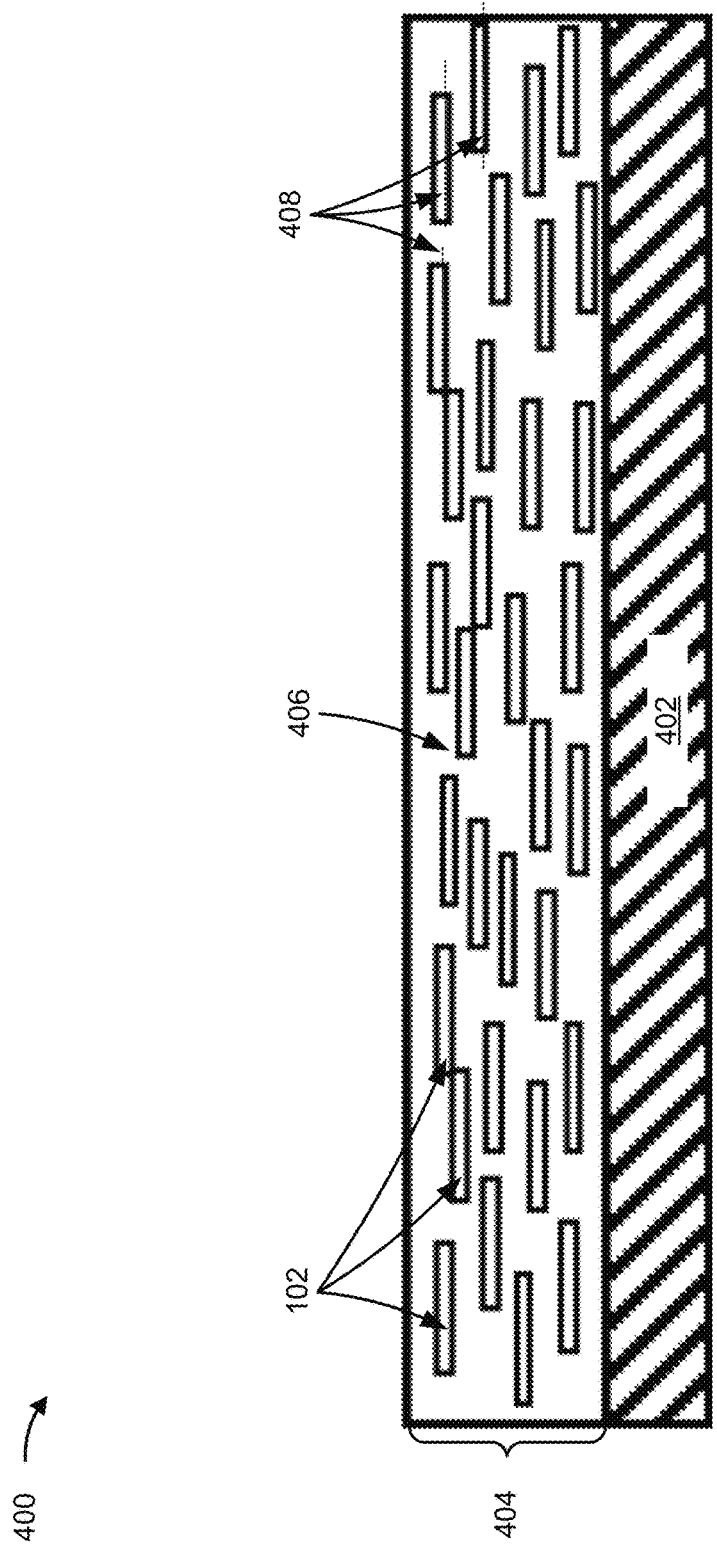
FIGS. 4A-4D are diagrams of an example implementation described herein.

FIG. 4A shows a cross-sectional view of a particular configuration of the example implementation 400. As shown in FIG. 4A, each MMA 102, of the plurality of MMAs 102, may have a reference plane 408 (e.g., a horizontal plane that may be orthogonal to the thickness dimension 116 of the MMA 102 described herein in relation to FIG. 1A). In some implementations, as further shown in FIG. 4A, respective reference planes 408 of a set of MMAs 102 (e.g., one or more MMAs 102), of the plurality of MMAs 102, may be approximately parallel to the surface of the component 402 (e.g., parallel to the surface of the component 402 within a tolerance, which may be less than or equal to 1 degree, 2 degrees, or 3 degrees, among other examples).

Figure 4B:
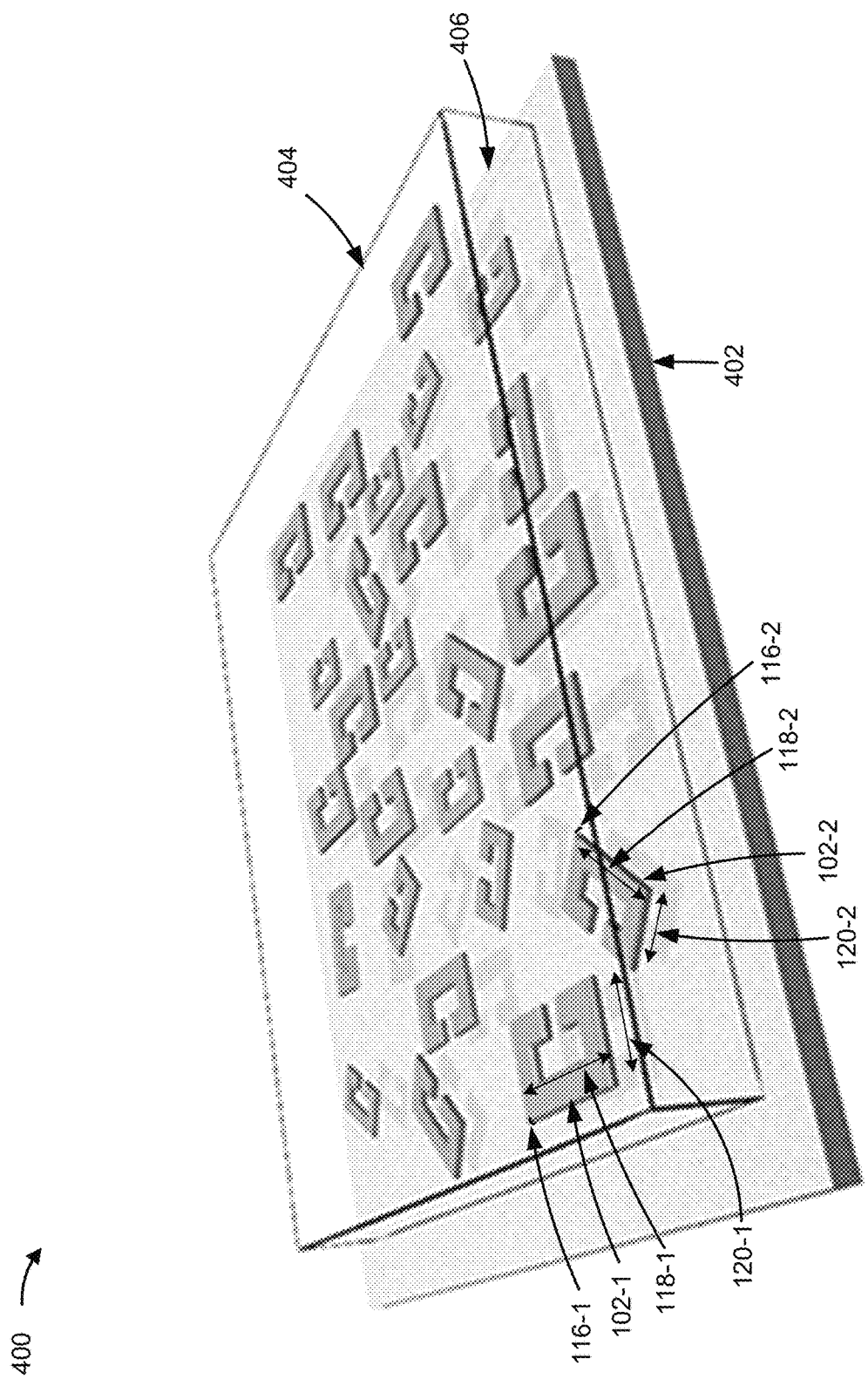

FIG. 4B shows an offset view of a particular configuration of the example implementation 400. As shown in FIG. 4B, the plurality of MMAs 102 may each have a same profile (e.g., a C-shaped profile) and may each have a reference plane 408 (e.g., a horizontal plane, not shown in FIG. 4B) that is approximately parallel to the surface of the component 402. As further shown in FIG. 4B, a first MMA 102-1 and a second MMA 102-2, of the plurality of MMAs 102, may have different sizes. For example, a first difference between a length dimension 118-1 of the first MMA 102-1 and a length dimension 118-2 of the second MMA 102-2 may satisfy (e.g., be greater than or equal to) a length difference threshold, which may be greater than or equal to 10 nm; a second difference between a width dimension 120-1 of the first MMA 102-1 and a width dimension 120-2 of the second MMA 102-2 may satisfy (e.g., be greater than or equal to) a width difference threshold, which may be greater than or equal to 10 nm; and/or a third difference between a thickness dimension 116-1 of the first MMA 102-1 and a thickness dimension 116-2 of the second MMA 102-2 may satisfy (e.g., be greater than or equal to) a thickness difference threshold, which may be greater than or equal to 10 nm. As additionally shown in FIG. 4B, the first MMA 102-1 and the second MMA 102-2 may have different orientations within the binder 406 (e.g., the length dimension 118-1 and the length dimension 118-2 may not be parallel to each other and/or the width dimension 120-1 and the width dimension 120-2 may not be parallel to each other).

Figure 4C:
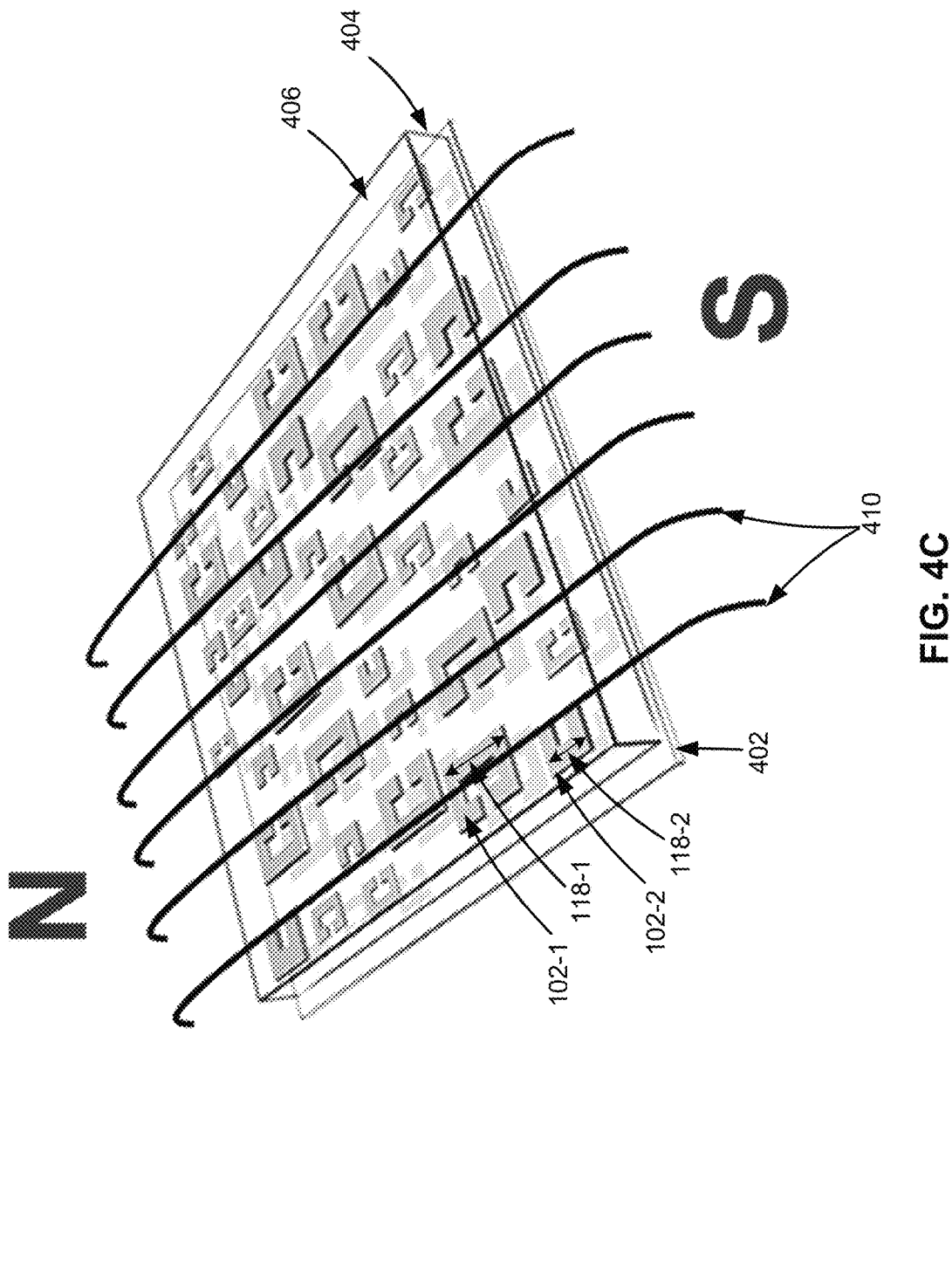

FIG. 4C shows an offset view of another particular configuration of the example implementation 400. As shown in FIG. 4C, the plurality of MMAs 102 may each have a same profile (e.g., a C-shaped profile) and may each have a reference plane 408 (e.g., a horizontal plane not shown in FIG. 4C) that is approximately parallel to the surface of the component 402. As further shown in FIG. 4C, a first MMA 102-1 and a second MMA 102-2, of the plurality of MMAs 102, may have different sizes and may have the same orientations within the binder 406. For example, a length dimension 118-1 of the first MMA 102-1 and a length dimension 118-2 of the second MMA 102-2 may be approximately parallel to each other. The first MMA 102-1 and the second MMA 102-2 may be aligned by application of one or more magnetic field lines 410 (e.g., that are approximately parallel to the surface of the component 402) to the plurality of MMAs 102 within the binder 406 (e.g., before the binder 406 cures).

Figure 4D:
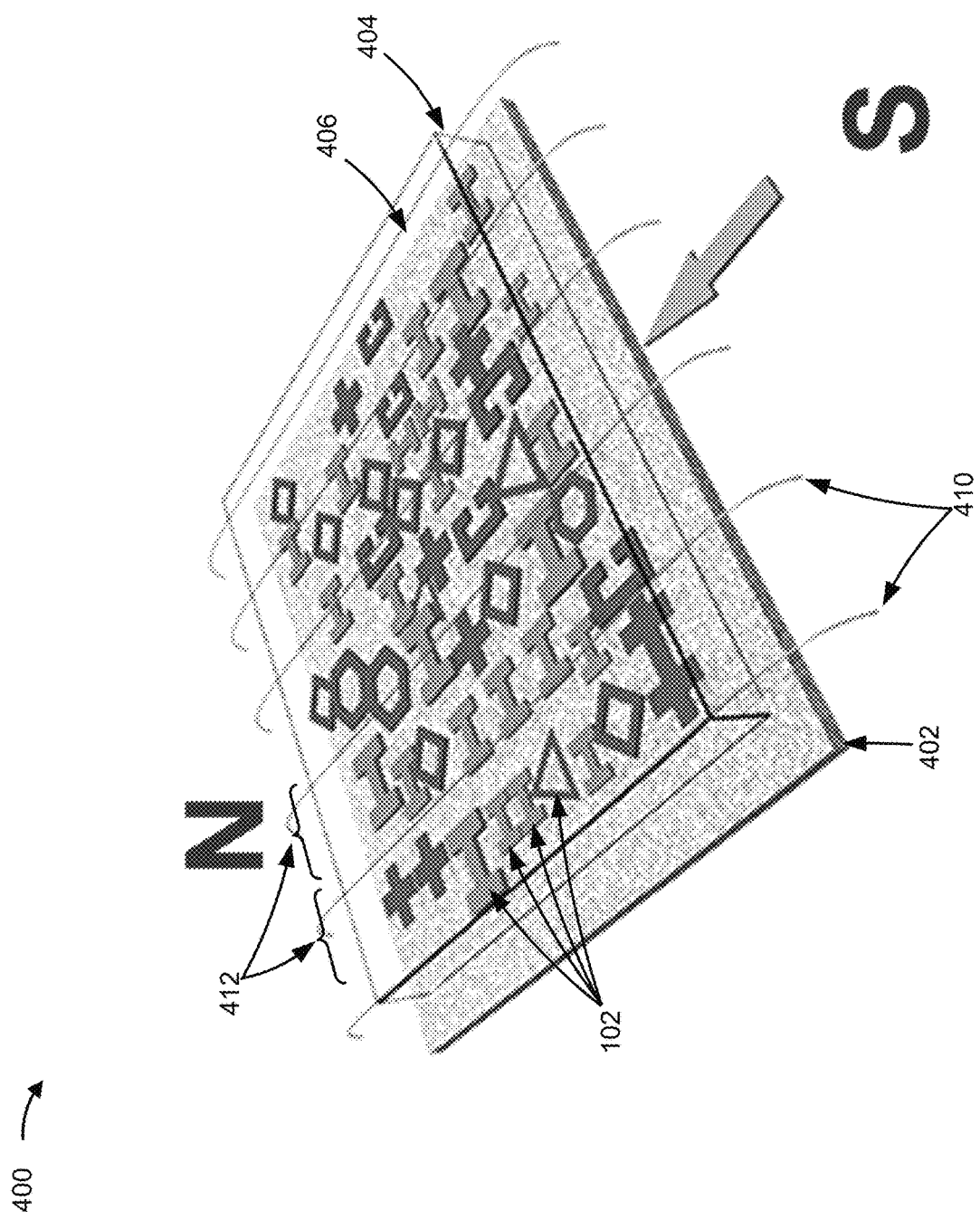

FIG. 4D shows an offset view of another particular configuration of the example implementation 400. As shown in FIG. 4D, the plurality of MMAs 102 may each have a particular profile, of a plurality of profiles, and may each have a reference plane 408 (e.g., a horizontal plane, not shown in FIG. 4D) that is approximately parallel to the surface of the component 402. As further shown in FIG. 4D, the plurality of MMAs 102 may include one or more sets of MMAs 412 (e.g., where each set of MMAs 412 includes one or more MMAs 102 of the same or different profiles and/or sizes). As additionally shown in FIG. 4D, each set of MMAs 412 may be aligned in a chain (e.g., the one or more MMAs 102 of the set of MMAs 412 are connected in a line, and may be aligned by application of magnetic field lines 410 to the plurality of MMAs 102 within the binder 406). Respective chains of the one or more sets of MMAs 412 may be approximately parallel to each other.

As indicated above, FIGS. 4A-4D are provided as one or more examples. Other examples may differ from what is described with regard to FIGS. 4A-4D.

FIGS. 5A-5G are diagrams of an example implementation 500 described herein. As shown in FIGS. 5A-5G, example implementation 500 may include a component 502 (e.g., a metal component), and a coating 504 disposed on the surface of the component 502. The coating 504 may include a first plurality of MMAs 102-A, which may be disposed within a first binder 506-A (e.g., an organic binder) of the coating 504 in a first layer 508-A of the coating 504, a second plurality of MMAs 102-B, which may be disposed within a second binder 506-B of the coating 504 in a second layer 508-B of the coating 504, and so on.

Figure 5A:
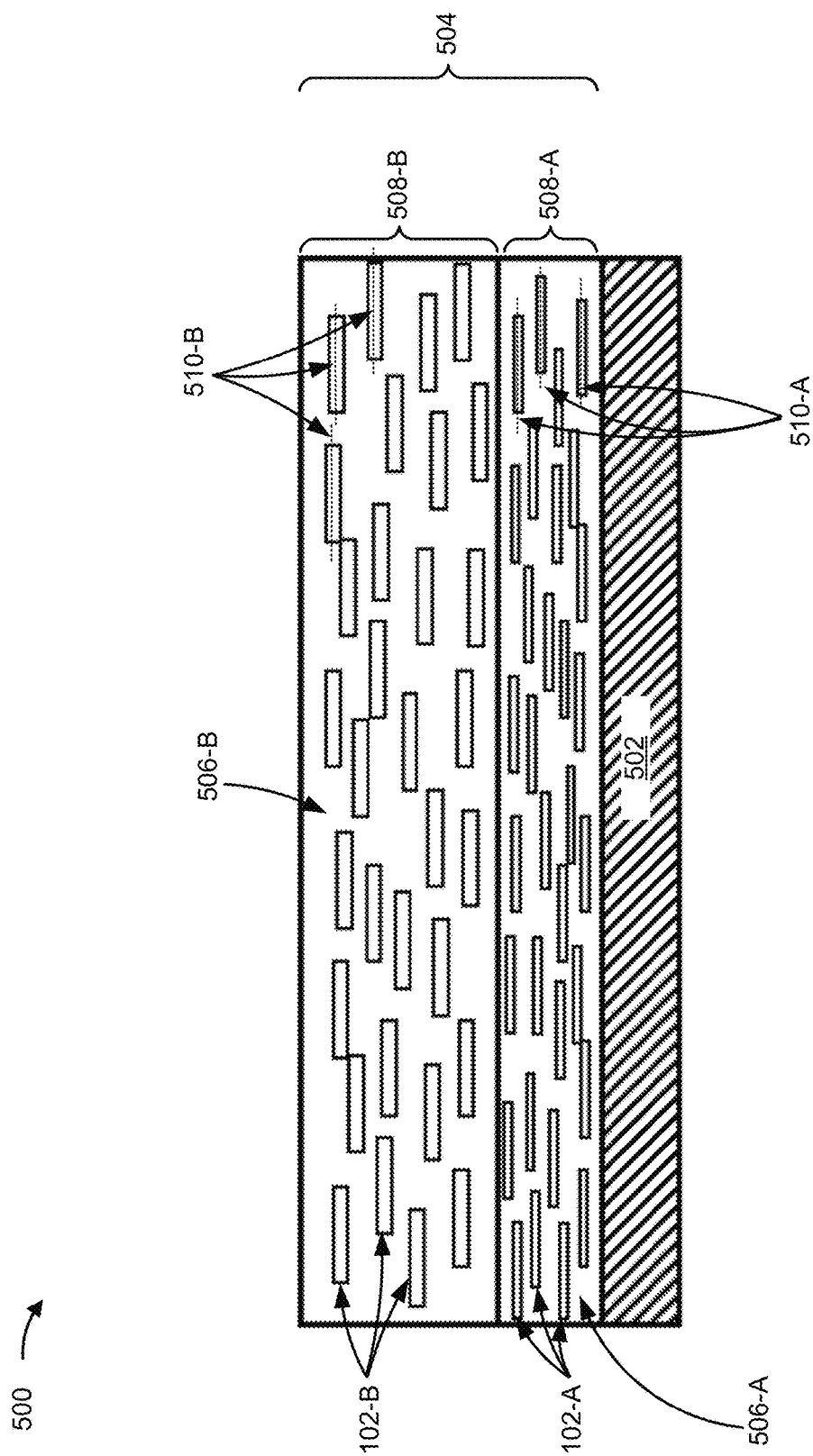
FIGS. 5A-5G are diagrams of an example implementation described herein.

FIG. 5A shows a cross-sectional view of a particular configuration of the example implementation 500. As shown in FIG. 5A, each MMA 102-A, of the first plurality of MMAs 102-A, may have a reference plane 510-A (e.g., a horizontal plane) and each MMA 102-B, of the second plurality of MMAs 102-B, may have a reference plane 510-B (e.g., a horizontal plane). In some implementations, as further shown in FIG. 5A, respective reference planes 510-A of a first set of MMAs 102-A (e.g., one or more MMAs 102-A), of the first plurality of MMAs 102-A, may be approximately parallel to respective reference planes 510-B of a second set of MMAs 102-B (e.g., one or more MMAs 102-B), of the second plurality of MMAs 102-B (e.g., parallel to each other within a tolerance, which may be less than or equal to 1 degree, 2 degrees, or 3 degrees, among other examples).

Figure 5B:
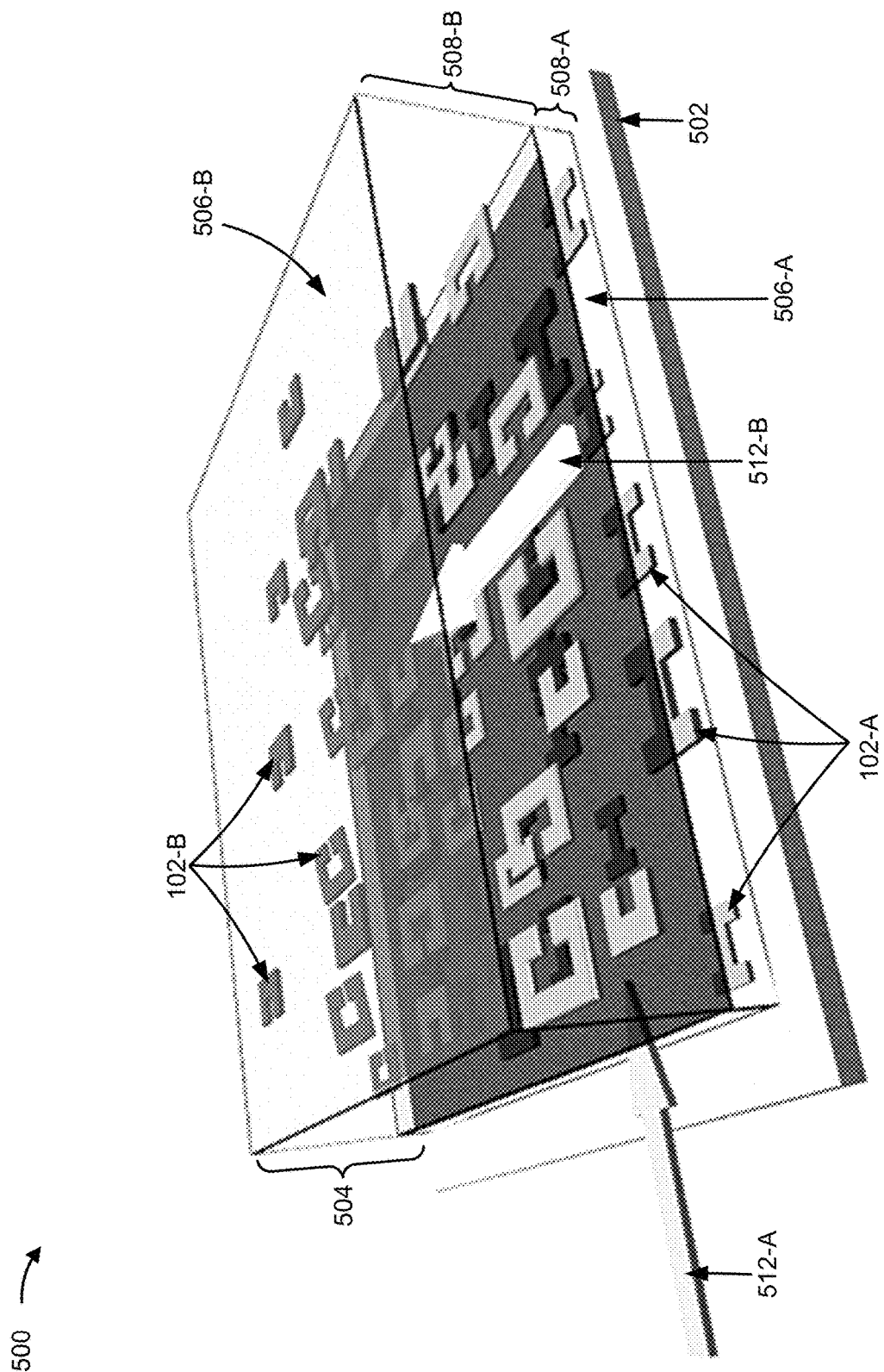

FIG. 5B shows an offset view of a particular configuration of the example implementation 500. As shown in FIG. 5B, the first plurality of MMAs 102-A may each have a same first profile (e.g., an H-shaped profile) and the second plurality of MMAs 102-B may each have a same second profile (e.g., a C-shaped profile). As further shown in FIG. 5B, the first plurality of MMAs 102-A may be oriented in a first direction 512-A (e.g., respective length dimensions of the first plurality of MMAs 102-A may be approximately parallel to the first direction 512-A) and the second plurality of MMAs 102-B may be oriented in a second direction 512-B (e.g., respective length dimensions of the second plurality of MMAs 102-B may be approximately parallel to the second direction 512-B). The first direction 512-A and the second direction 512-B may be the same or different. The first plurality of MMAs 102-A may be aligned by application of one or more magnetic field lines to the first plurality of MMAs 102-A within the binder 506-A (e.g., before the binder 506-A is cured) and/or the second plurality of MMAs 102-B may be aligned by application of one or more magnetic field lines to the first plurality of MMAs 102-B within the binder 506-B (e.g., before the binder 506-B is cured).

Figure 5C:
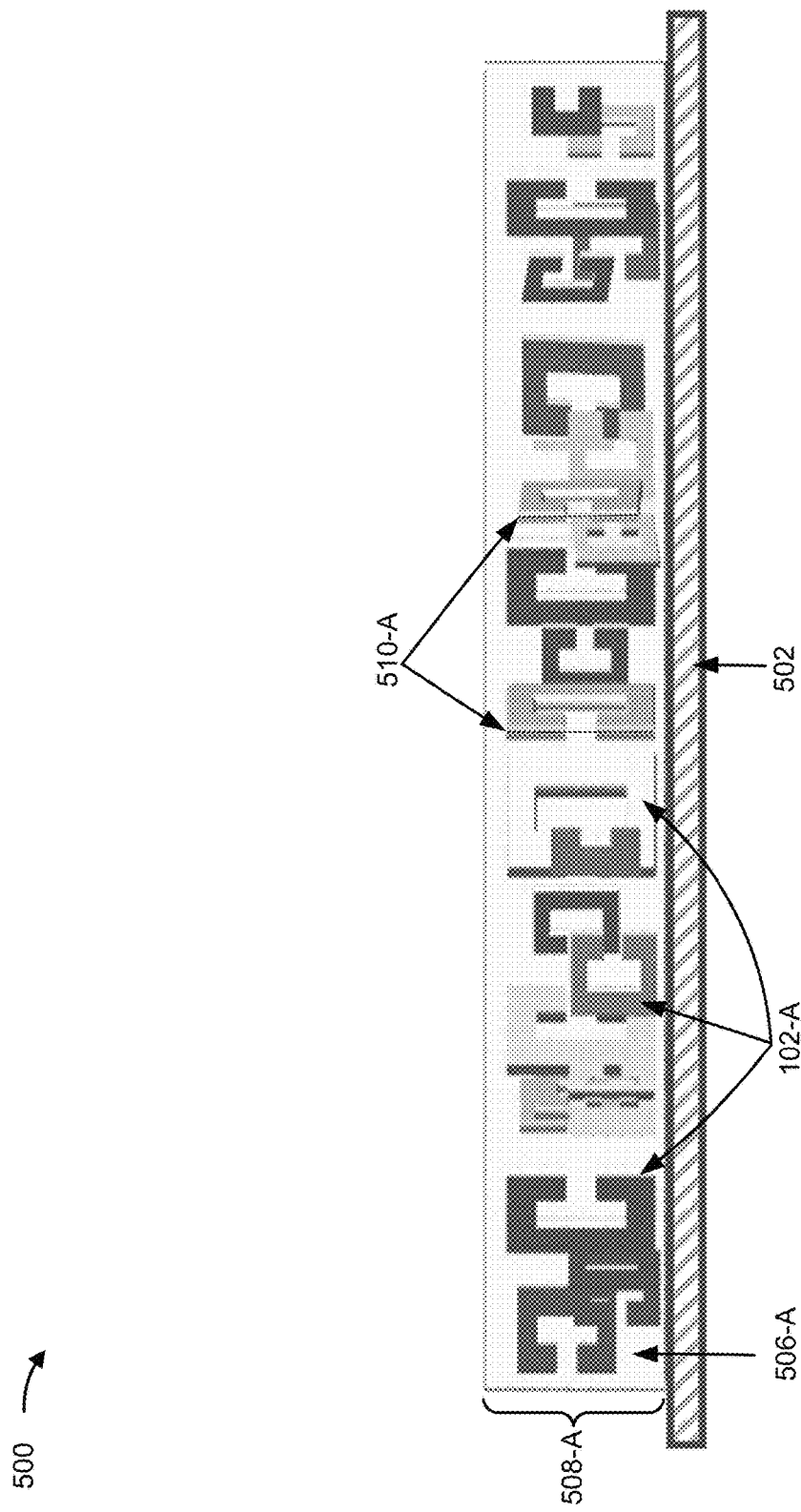
Figure 5D:
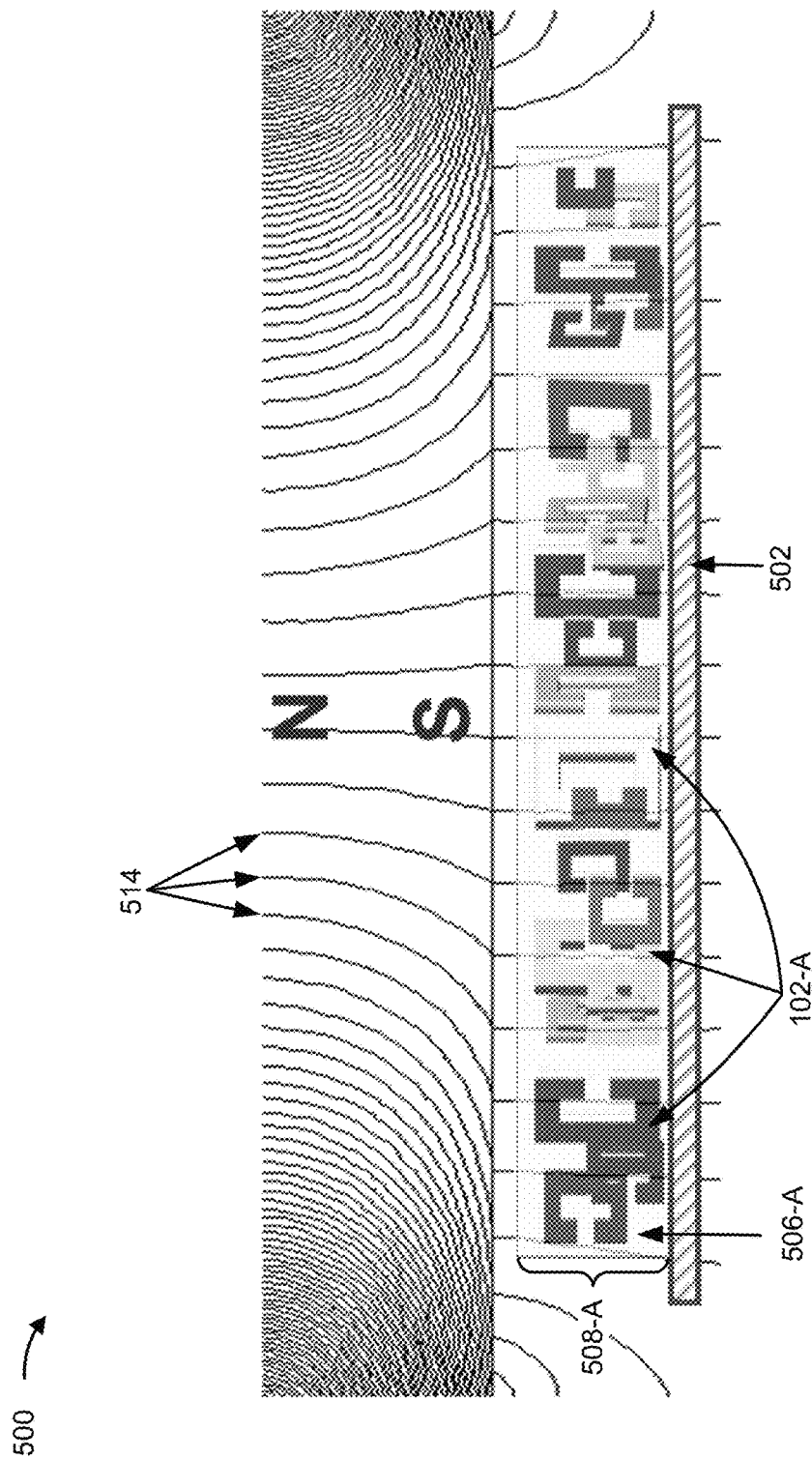

FIGS. 5C-5D show cross-sectional views of a particular configuration of the example implementation 500. As shown in FIGS. 5C-5D, respective reference planes 510-A (e.g., vertical planes) of a first set of MMAs 102-A (e.g., one or more MMAs 102-A), of the first plurality of MMAs 102-A, may be approximately perpendicular to the surface of the component 502 (e.g., perpendicular to the surface of the component 502 within a tolerance, which may be less than or equal to 1 degree, 2 degrees, or 3 degrees, among other examples). As further shown in FIG. 5D, the first set of MMAs 102-A may be aligned by application of one or more magnetic field lines 514 (e.g., that are approximately perpendicular to the surface of the component 502) to the first plurality of MMAs 102-A within the binder 506-A (e.g., before the binder 506-A cures).

Figure 5E:
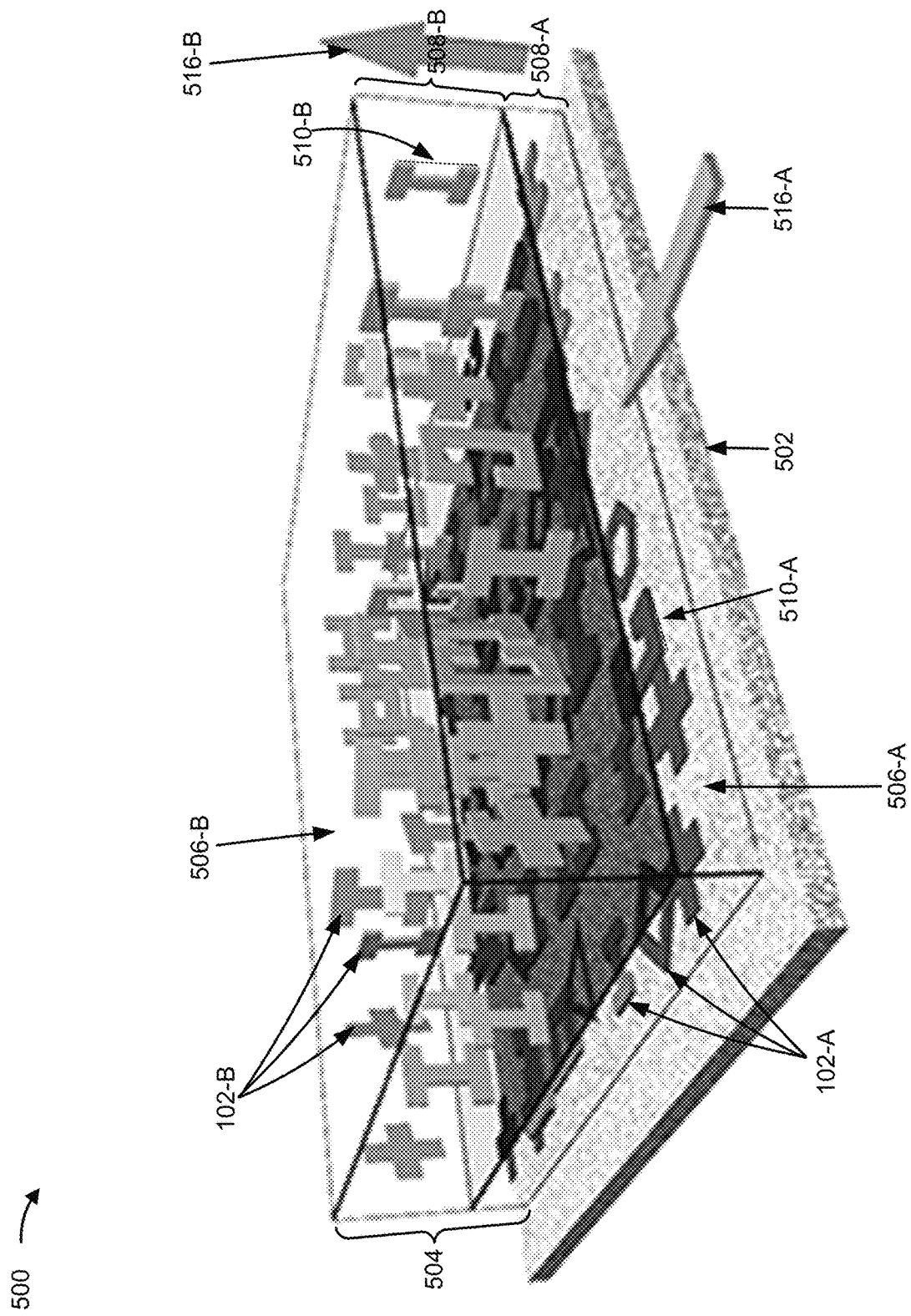

FIG. 5E shows an offset view of a particular configuration of the example implementation 500. As shown in FIG. 5E, the first plurality of MMAs 102-A may each have a particular profile, of a plurality of profiles, and the second plurality of MMAs 102-B may each have a particular profile of the plurality of profiles. As further shown in FIG. 5E, the first plurality of MMAs 102-A may be oriented in a first direction 516-A (e.g., respective length dimensions of the first plurality of MMAs 102-A may be approximately parallel to the first direction 516-A) and the second plurality of MMAs 102-B may be oriented in a second direction 516-B (e.g., respective length dimensions of the second plurality of MMAs 102-B may be approximately parallel to the second direction 516-B). As additionally shown in FIG. 5E, respective reference planes 510-A (e.g., horizontal planes) of a first set of MMAs 102-A (e.g., one or more MMAs 102-A), of the first plurality of MMAs 102-A, may be approximately perpendicular to respective reference planes 510-B (e.g., vertical planes) of a second set of MMAs 102-B (e.g., one or more MMAs 102-B), of the second plurality of MMAs 102-B (e.g., perpendicular to each other within a tolerance, which may be less than or equal to 1 degree, 2 degrees, or 3 degrees, among other examples).

Figure 5F:
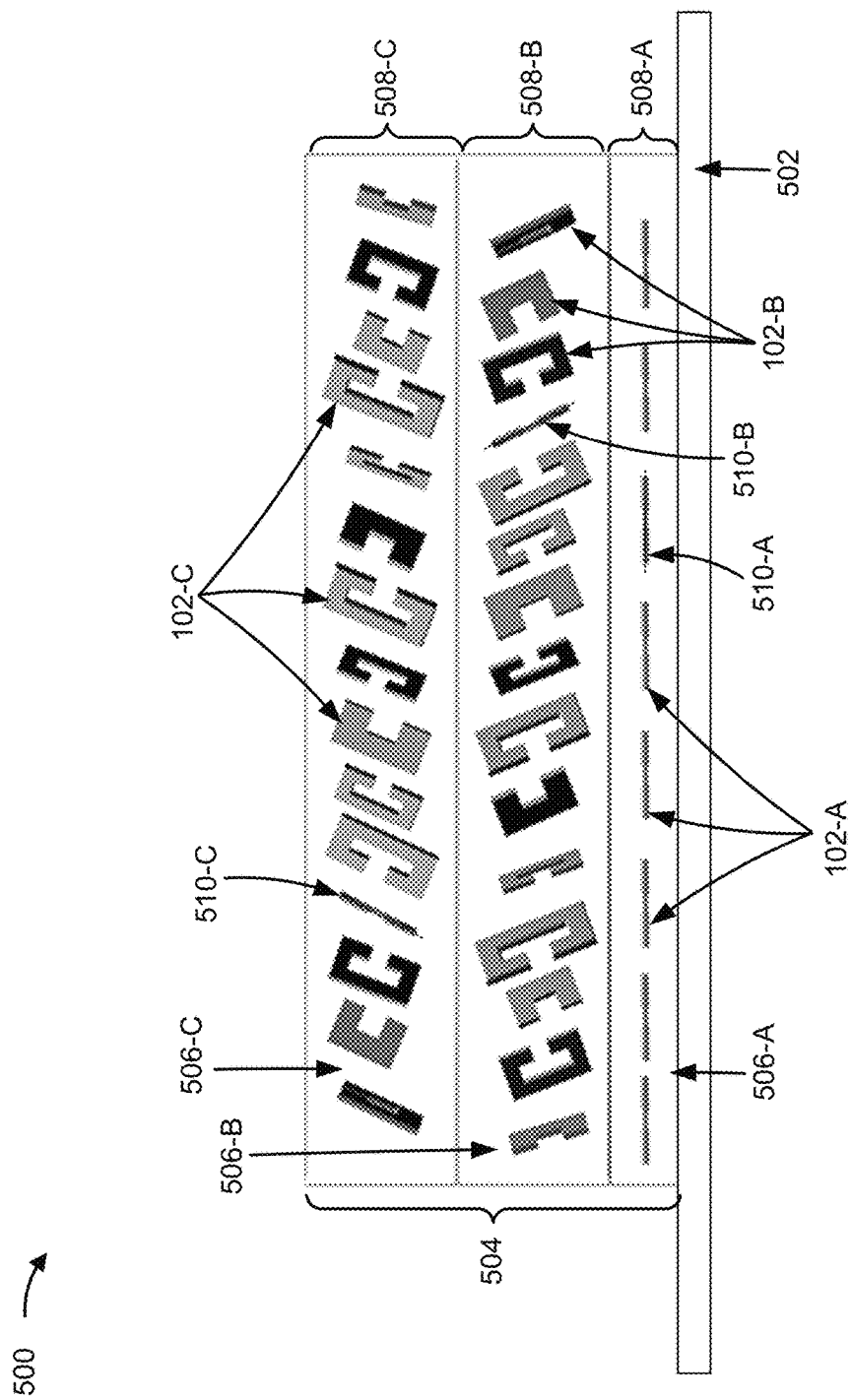

FIG. 5F shows a cross-sectional view of a particular configuration of the example implementation 500. As shown in FIG. 5F, the coating 504 may include a first plurality of MMAs 102-A, which may be disposed within a first binder 506-A of the coating 504 in a first layer 508-A of the coating 504, a second plurality of MMAs 102-B, which may be disposed within a second binder 506-B of the coating 504 in a second layer 508-B of the coating 504, and a third plurality of MMAs 102-C, which may be disposed within a third binder 506-C of the coating 504 in a third layer 508-C of the coating 504. As further shown in FIG. 5F, respective reference planes 510-A (e.g., horizontal planes) of the first plurality of MMAs 102-A may be approximately parallel to the surface of the component 502, respective reference planes 510-B of the second plurality of MMAs 102-B may be aligned at a first alignment angle to the surface of the component 502 (e.g., that is not parallel to the surface of the component 502), and respective reference planes 510-C of the third plurality of MMAs 102-C may be aligned at a second alignment angle to the surface of the component 502 (e.g., that is not parallel to the surface of the component 502).

Figure 5G:
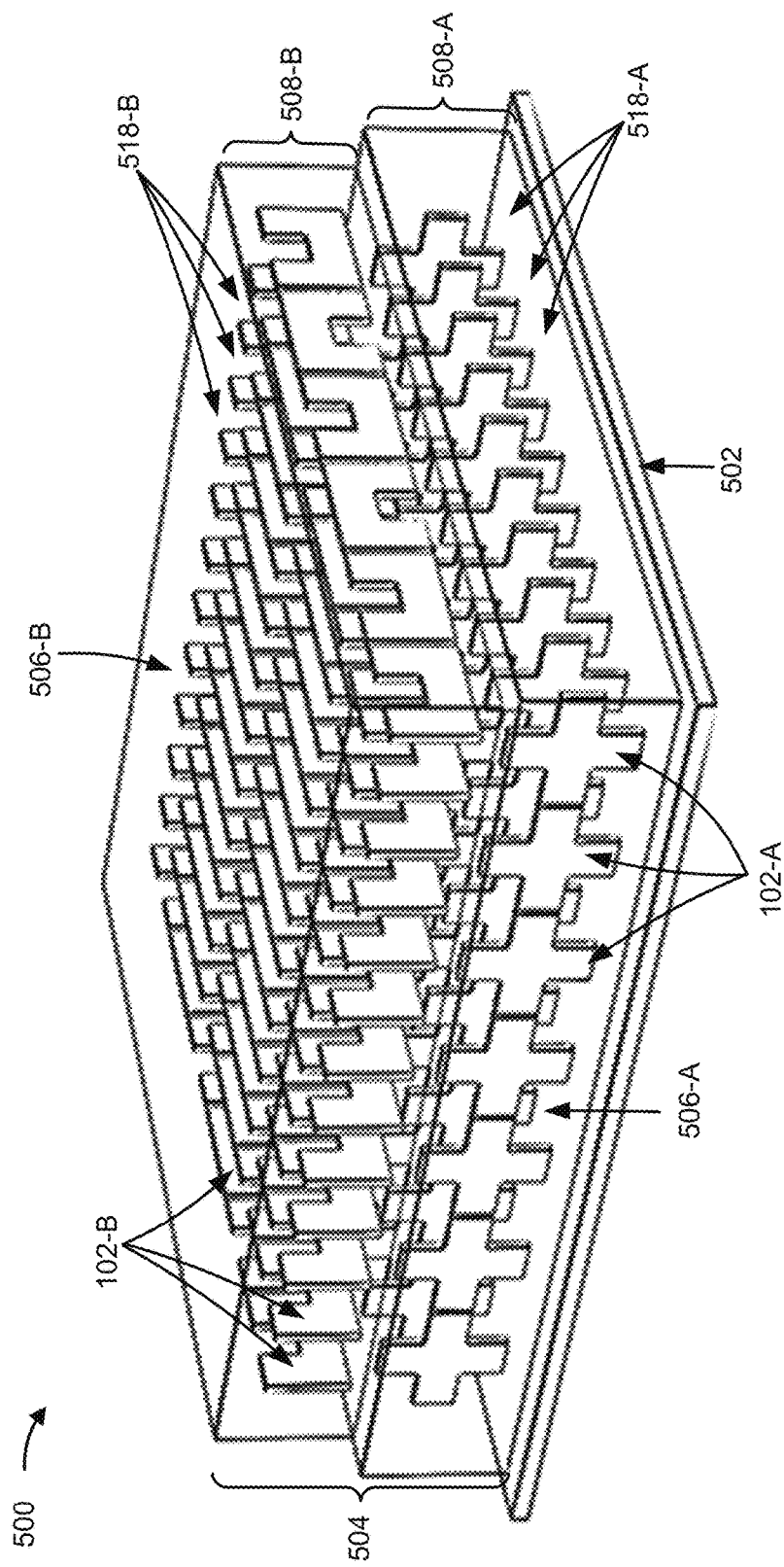

FIG. 5G shows an offset view of a particular configuration of the example implementation 500. As shown in FIG. 5G, the first plurality of MMAs 102-A may include one or more first sets of MMAs 518-A (e.g., where each first set of MMAs 518-A includes one or more MMAs 102-A of the same or different profiles and/or sizes) and the second plurality of MMAs 102-B may include one or more second sets of MMAs 518-B (e.g., where each second set of MMAs 518-B includes one or more MMAs 102-B of the same or different profiles and/or sizes). As additionally shown in FIG. 5G, each first set of MMAs 518-A may be aligned in a chain (e.g., the one or more MMAs 102-A of the first set of MMAs 518-A are connected in a line) and respective chains of the one or more first sets of MMAs 518-A may be approximately parallel to each other. Additionally, each second set of MMAs 518-B may be aligned in a chain (e.g., the one or more MMAs 102-B of the second set of MMAs 518-B are connected in a line) and respective chains of the one or more second sets of MMAs 518-B may be approximately parallel to each other. In some implementations, a difference between a first alignment angle of the first set of MMAs 518-A and a second alignment angle of the second set of MMAs 518-B may satisfy (e.g., be greater than or equal to) an alignment angle difference threshold, which may be greater than or equal to 1 degree, 2 degrees, or 3 degrees, among other examples.

As indicated above, FIGS. 5A-5G are provided as one or more examples. Other examples may differ from what is described with regard to FIGS. 5A-5G.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A metamaterial absorber (MMA) to absorb a particular range of electromagnetic radiation, comprising:
    a first metal or semiconductor material,
        wherein the first metal or semiconductor material is a resistive material that comprises a silicon material;
    a dielectric material disposed on the first metal or semiconductor material,
        wherein the dielectric material comprises a magnesium fluoride material; and
    a second metal material disposed on the dielectric material, wherein:
        the second metal material is different from the first metal or semiconductor material,
        the second metal material is a magnetic metal material,
        a length dimension associated with the MMA is less than or equal to 200 micrometers (μm),
        a width dimension associated with the MMA is less than or equal to 200 μm, a thickness dimension associated with the MMA is less than or equal to 8 μm,
    a profile of the MMA comprises:
        a C-shaped profile,
        an H-shaped profile, or
        a U-shaped profile, and
    the particular range of electromagnetic radiation is between 300 micrometers (μm) and 10 centimeters (cm).

2. The MMA of claim 1, wherein the first metal or semiconductor material further comprises at least one of:
    an aluminum material, or
    a copper material.

3. The MMA of claim 1, wherein a thickness of the first metal or semiconductor material is less than or equal to 1 μm.

4. The MMA of claim 1, wherein the dielectric material further comprises a silicon dioxide material.

5. The MMA of claim 1, wherein a thickness of the dielectric material is less than or equal to 5 μm.

6. The MMA of claim 1, wherein the second metal material comprises at least one of:
    stainless steel,
    mild steel,
    element nickel,
    elemental iron,
    an iron-nickel alloy,
    an iron-aluminum alloy,
    a nickel-chromium-aluminum alloy,
    an iron-silicon alloy,
    an iron-ytterbium alloy,
    an iron-gallium alloy,
    a ferrite,
    a samarium-cobalt alloy,
    a neodymium-boron-iron alloy,
    a carbon-enriched iron,
    an aluminum-nickel-cobalt alloy, or
    an iron-nickel alloy.

7. The MMA of claim 1, wherein a thickness of the second metal material is less than or equal to 2 μm.

8. A coating disposed on a surface of a component, comprising:
    a first layer that includes a first plurality of metamaterial absorbers (MMAs) disposed within a first binder,
        wherein each MMA, of the first plurality of MMAs, comprises:
            a first metal or semiconductor material;
            a dielectric material disposed on the first metal or semiconductor material; and
            a second metal material disposed on the dielectric material, wherein:
                the second metal material is different from the first metal or semiconductor material,
                the second metal material is a magnetic metal material,
                a length dimension associated with the MMA is less than or equal to 200 micrometers (μm),
                a width dimension associated with the MMA is less than or equal to 200 μm, and
                a thickness dimension associated with the MMA is less than or equal to 8 μm; and
        wherein the first plurality of MMAs includes a first MMA and a second MMA that is oriented oblique relative to the first MMA.

9. The coating of claim 8, wherein respective reference planes of a set of MMAs, of the first plurality of MMAs, are approximately parallel to the surface of the component.

10. The coating of claim 8, wherein respective reference planes of a set of MMAs, of the first plurality of MMAs, are approximately perpendicular to the surface of the component.

11. The coating of claim 8, wherein a set of MMAs, of the first plurality of MMAs, is aligned in a chain.

12. The coating of claim 8, further comprising a second layer that includes a second plurality of MMAs disposed within a second binder, wherein:
    respective reference planes of a first set of MMAs, of the first plurality of MMAs, are approximately parallel to respective reference planes of a second set of MMAs of the second plurality of MMAs.

13. The coating of claim 8, further comprising a second layer that includes a second plurality of MMAs disposed within a second binder,
    wherein respective reference planes of a first set of MMAs, of the first plurality of MMAs, are approximately perpendicular to respective horizontal planes of a second set of MMAs of the second plurality of MMAs.

14. The coating of claim 8, further comprising a second layer that includes a second plurality of MMAs disposed within a second binder, wherein:
    the first plurality of MMAs includes a first set of MMAs aligned in a first chain;
    the second plurality of MMAs includes a second set of MMAs aligned in a second chain; and
    a difference between a first alignment angle of the first set of MMAs and a second alignment angle of the second set of MMAs satisfies an alignment angle difference threshold.

15. A method, comprising:
    depositing, by a deposition system, a release material on a resin material,
        wherein the resin material is embossed with a plurality of unit cells;
    depositing, by the deposition system, a first metal or semiconductor material on the release material;
    depositing, by the deposition system, a dielectric material on the first metal or semiconductor material; and
    depositing, by the deposition system, a second metal material on the dielectric material, wherein:
        the second metal material is different from the first metal or semiconductor material,
        the second metal material is a magnetic metal material, portions of the first metal or semiconductor material, the dielectric material, and the second metal material that are respectively deposited on the plurality of unit cells form a plurality of metamaterial absorbers (MMAs), a length dimension associated with each MMA, of the plurality of MMAs, is less than or equal to 200 micrometers (μm), a width dimension associated with each MMA, of the plurality of MMAs, is less than or equal to 200 μm, and a thickness dimension associated with each MMA, of the plurality of MMAs, is less than or equal to 8 μm.

16. The method of claim 15, further comprising:
removing the plurality of MMAs from the release material; and
singulating the plurality of MMAs.

17. The method of claim 15, wherein the plurality of unit cells is arranged in at least one tessellation pattern.

18. The method of claim 15, wherein the plurality of MMAs includes a first MMA and a second MMA, wherein at least one of:
a first difference between a length dimension of the first MMA and a length dimension of the second MMA satisfies a length difference threshold;
a second difference between a width dimension of the first MMA and a width dimension of the second MMA satisfies a width difference threshold; or
a third difference between a thickness dimension of the first MMA and a thickness dimension of the second MMA satisfies a thickness difference threshold.

19. The coating of claim 8, wherein a profile of the first MMA comprises:
a C-shaped profile,
an H-shaped profile,
a U-shaped profile,
an I-shaped profile,
a loop-shaped profile,
a cross-shaped profile,
a bar-shaped profile, or
a round profile.

20. The coating of claim 8, wherein at least one of:
a profile of the first MMA is different than a profile of the second MMA,
a length of the first MMA is different from a length of the second MMA,
a width of the first MMA is different from a width of the second MMA, or
a thickness of the first MMA is different from a thickness of the second MMA.

* * * * *